US012756499B2

(12) United States Patent
Chen et al.

(10) Patent No.: US 12,756,499 B2
(45) Date of Patent: Oct. 6, 2026

(54) UPLINK CONTROL INFORMATION REPETITION MULTIPLEXING WITH UPLINK SHARED CHANNEL COMMUNICATIONS

(71) Applicant: QUALCOMM Incorporated, San Diego, CA (US)

(72) Inventors: Yitao Chen, San Diego, CA (US); Mostafa Khoshnevisan, San Diego, CA (US); Xiaoxia Zhang, San Diego, CA (US); Jing Sun, San Diego, CA (US); Tao Luo, San Diego, CA (US); Peter Gaal, San Diego, CA (US); Fang Yuan, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 517 days.

(21) Appl. No.: 17/998,147

(22) PCT Filed: Jun. 22, 2020

(86) PCT No.: PCT/CN2020/097508

§ 371 (c)(1),
(2) Date: Nov. 7, 2022

(87) PCT Pub. No.: WO2021/258261

PCT Pub. Date: Dec. 30, 2021

(65) Prior Publication Data

US 2023/0224081 A1 Jul. 13, 2023

(51) Int. Cl.
*H04L 1/08* (2006.01)
*H04L 1/00* (2006.01)
(Continued)

(52) U.S. Cl.
CPC .............. *H04L 1/08* (2013.01); *H04L 1/0003* (2013.01); *H04W 72/1268* (2013.01); *H04W 72/20* (2023.01)

(58) Field of Classification Search
None
See application file for complete search history.

(56) References Cited

U.S. PATENT DOCUMENTS

2005/0249120 A1* 11/2005 Heo ...................... H04L 1/1874 370/236
2011/0317598 A1* 12/2011 Takagi .................. H04L 1/1812 370/310

(Continued)

FOREIGN PATENT DOCUMENTS

CN 108293248 A 7/2018
WO WO-2018191596 10/2018

(Continued)

OTHER PUBLICATIONS

International Search Report and Written Opinion—PCT/CN2020/097508—ISA/EPO—Mar. 12, 2021.

(Continued)

*Primary Examiner* — The Hy Nguyen
(74) *Attorney, Agent, or Firm* — Holland & Hart LLP

(57) ABSTRACT

Methods, systems, and devices for wireless communications are described in which UEs and base stations may transmit multiple repetitions of certain communications, which may enhance the likelihood of successful reception and decoding such communications. A base station may configure a UE to transmit multiple repetitions of uplink control information (UCI) that each use a same number of coded bits for each repetition, which may allow for soft buffering and combining of the multiple repetitions the base station. The UE may select one of the repetitions for determining the number of (Continued)

coded bits, and may adjust one or more other repetitions of the UCI to provide the same number of coded bits.

28 Claims, 21 Drawing Sheets

(51) Int. Cl.
*H04W 72/1268* (2023.01)
*H04W 72/20* (2023.01)

(56) References Cited

U.S. PATENT DOCUMENTS

2012/0320852 A1* 12/2012 Seo ........................ H04L 1/0041
370/329
2013/0114554 A1 5/2013 Yang et al.
2018/0302895 A1 10/2018 Akkarakaran et al.
2019/0215826 A1 7/2019 Baldemair et al.
2021/0092762 A1* 3/2021 Choi ...................... H04L 1/1854
2021/0410165 A1* 12/2021 Xiong ...................... H04L 5/001
2022/0053483 A1* 2/2022 Yoshioka .......... H04W 72/1268
2023/0054490 A1* 2/2023 Wong .................... H04L 1/1854

FOREIGN PATENT DOCUMENTS

WO WO-2018204513 A1 11/2018
WO WO-2019112723 6/2019
WO WO-2020065740 A1 4/2020

OTHER PUBLICATIONS

Supplementary European Search Report—EP20942338—Search Authority—The Hague—Feb. 23, 2024.

* cited by examiner

2100

UPLINK CONTROL INFORMATION REPETITION MULTIPLEXING WITH UPLINK SHARED CHANNEL COMMUNICATIONS

CROSS REFERENCE

The present Application is a 371 national stage filing of International PCT Application No. PCT/CN2020/097508 by CHEN et al. entitled "UPLINK CONTROL INFORMATION REPETITION MULTIPLEXING WITH UPLINK SHARED CHANNEL COMMUNICATIONS," filed Jun. 22, 2020, which is assigned to the assignee hereof, and which is expressly incorporated by reference in its entirety herein.

FIELD OF TECHNOLOGY

The following relates generally to wireless communications and more specifically to uplink control information repetition multiplexing with uplink shared channel communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support uplink control information (UCI) repetition multiplexing with uplink shared channel communications. Various aspects of the described techniques provide for transmission of multiple repetitions of UCI in which a number of coded bits in each repetition allows for soft buffering and combining of the multiple repetitions at a base station that receives the UCI from a user equipment (UE). In some cases, a first repetition of the UCI may be transmitted in uplink control channel (e.g., physical uplink control channel (PUCCH)) resources, and a second repetition of the UCI may be transmitted on uplink shared channel (e.g., physical uplink shared channel (PUSCH)) resources. In some cases, a number of coded bits for each repetition may be selected based on a first number of coded bits of the first repetition transmitted via the control channel or based on a second number of coded bits of the second repetition transmitted via PUSCH. Using a same number of coded bits for each repetition of the UCI may allow for a same mother code to be used in an encoding scheme (e.g., polar coding) that is used to encode the UCI, thus allowing for soft combining of the multiple repetitions. In some cases, the UE may encode and perform rate-matching of the UCI based on the control channel repetition and then determine a number of resource elements for PUSCH multiplexing, or the UE may encode and perform rate-matching of the UCI based on the PUSCH repetition and then determine a number of resource blocks for the control channel repetition.

In some cases, a first repetition of UCI may be transmitted on first PUSCH resources, and a second repetition of the UCI may be transmitted on second PUSCH resources. In some cases, a number of coded bits for each repetition may be selected based on a first number of coded bits of the first repetition transmitted via the first PUSCH or based on a second number of coded bits of the second repetition transmitted via the second PUSCH. Using a same number of coded bits for each repetition of the UCI may allow for a same mother code to be used in an encoding scheme, thus allowing for soft combining of the multiple repetitions. In some cases, the UE may encode and perform rate-matching of the UCI based on one of the PUSCH repetitions and then determine a number of resource elements for the other PUSCH multiplexing.

A method of wireless communication at a UE is described. The method may include determining that a first repetition of a control information communication is to be transmitted in a first uplink communication to a base station, and that a second repetition of the control information communication is to be transmitted in a second uplink communication to the base station, where the first uplink communication and the second uplink communication use one or more of a different modulation and coding scheme or a different number of transmission layers, determining a number of resource elements for transmitting each of the first repetition and the second repetition of the control information communication such that each of the first repetition and the second repetition have a same number of coded bits for transmission to the base station, encoding, based on the determined number of resource elements, the first repetition of the control information communication and the second repetition of the control information communication to generate an encoded first repetition and an encoded second repetition that each have the same number of coded bits, and transmitting, to the base station, the first uplink communication with the encoded first repetition and the second uplink communication with the encoded second repetition.

An apparatus for wireless communication at a UE is described. The apparatus may include a processor, memory coupled with the processor, and instructions stored in the memory. The instructions may be executable by the processor to cause the apparatus to determine that a first repetition of a control information communication is to be transmitted in a first uplink communication to a base station, and that a second repetition of the control information communication is to be transmitted in a second uplink communication to the base station, where the first uplink communication and the second uplink communication use one or more of a different modulation and coding scheme or a different number of transmission layers, determine a number of resource elements for transmitting each of the first repetition and the second repetition of the control information communication such that each of the first repetition and the second repetition have a same number of coded bits for transmission to the base station, encode, based on the determined number of resource elements, the first repetition of the control information communication and the second repetition of the control information communication to generate an encoded first repetition and an encoded second repetition that each have the same number of coded bits, and transmit, to the base station, the first uplink communication with the encoded first repetition and the second uplink communication with the encoded second repetition.

Another apparatus for wireless communication at a UE is described. The apparatus may include means for determining that a first repetition of a control information communication is to be transmitted in a first uplink communication to a base station, and that a second repetition of the control information communication is to be transmitted in a second uplink communication to the base station, where the first uplink communication and the second uplink communication use one or more of a different modulation and coding scheme or a different number of transmission layers, determining a number of resource elements for transmitting each of the first repetition and the second repetition of the control information communication such that each of the first repetition and the second repetition have a same number of coded bits for transmission to the base station, encoding, based on the determined number of resource elements, the first repetition of the control information communication and the second repetition of the control information communication to generate an encoded first repetition and an encoded second repetition that each have the same number of coded bits, and transmitting, to the base station, the first uplink communication with the encoded first repetition and the second uplink communication with the encoded second repetition.

A non-transitory computer-readable medium storing code for wireless communication at a UE is described. The code may include instructions executable by a processor to determine that a first repetition of a control information communication is to be transmitted in a first uplink communication to a base station, and that a second repetition of the control information communication is to be transmitted in a second uplink communication to the base station, where the first uplink communication and the second uplink communication use one or more of a different modulation and coding scheme or a different number of transmission layers, determine a number of resource elements for transmitting each of the first repetition and the second repetition of the control information communication such that each of the first repetition and the second repetition have a same number of coded bits for transmission to the base station, encode, based on the determined number of resource elements, the first repetition of the control information communication and the second repetition of the control information communication to generate an encoded first repetition and an encoded second repetition that each have the same number of coded bits, and transmit, to the base station, the first uplink communication with the encoded first repetition and the second uplink communication with the encoded second repetition.

In some examples of the method, apparatuses, and non-transitory computer-readable medium described herein, the first uplink communication uses an uplink control channel resource and the second uplink communication uses a PUSCH resource, and where the first repetition of the control information communication uses transmission parameters that are defined by a format of the uplink control channel and the second repetition of the control information communication uses transmission parameters that are provided for the PUSCH resource. In some examples of the method, apparatuses, and non-transitory computer-readable medium described herein, the determining the same number of coded bits may include operations, features, means, or instructions for selecting the number of coded bits associated with the first repetition of the control information communication or associated with the second repetition of the control information communication. In some examples of the method, apparatuses, and non-transitory computer-readable medium described herein, the determining the same number of coded bits further may include operations, features, means, or instructions for calculating a first number of coded bits for the first repetition of the control information communication using the uplink control channel resource, calculating a second number of coded bits for the second repetition of the control information communication using the PUSCH resource, and selecting the first number of coded bits or the second number of coded bits to be used for both the first repetition and the second repetition of the control information communication.

In some examples of the method, apparatuses, and non-transitory computer-readable medium described herein, a minimum or a maximum of the first number of coded bits or the second number of coded bits may be selected to be used for both the first repetition and the second repetition of the control information communication based on a configuration of the UE. In some examples of the method, apparatuses, and non-transitory computer-readable medium described herein, the number of coded bits associated with the uplink control channel resource or the PUSCH resource may be selected based on a configuration of the UE.

In some examples of the method, apparatuses, and non-transitory computer-readable medium described herein, an encoding sequence and a rate-matching output sequence associated with the first repetition of the control information communication and the second repetition of the control information communication have a same length that allows for soft combining of multiple repetitions of the control information communication. In some examples of the method, apparatuses, and non-transitory computer-readable medium described herein, the coded bits of the first repetition or the second repetition of the control information communication may be padded with zeros (or ones) when the selected number of coded bits is less than the first number of coded bits or the second number of coded bits, or, and a last number of coded bits of the first repetition or the second repetition of the control information communication may be dropped when the selected number of coded bits is greater than the first number of coded bits or the second number of coded bits.

In some examples of the method, apparatuses, and non-transitory computer-readable medium described herein, the determining the same number of coded bits further may include operations, features, means, or instructions for calculating a first number of coded bits for the first repetition of the control information communication using the uplink control channel resource, mapping the first number of coded bits to a first number of resource elements on the uplink control channel resource, and calculating the second number of coded bits associated with the second number of resource elements based on the first number of coded bits, where the second number of coded bits is equal to the first number of coded bits. In some examples of the method, apparatuses, and non-transitory computer-readable medium described herein, the determining the same number of coded bits further may include operations, features, means, or instructions for calculating a second number of coded bits for the second repetition of the control information communication using the PUSCH resource, mapping the second number of coded bits to a second number of resource elements on the PUSCH resource, and calculating a first number of coded bits associated with the first repetition based on the second number of coded bits, where the first number of coded bits is equal to the second number of coded bits.

In some examples of the method, apparatuses, and non-transitory computer-readable medium described herein, the first uplink communication uses a first PUSCH resource and the second uplink communication uses a second PUSCH resource, and where the first repetition of the control information communication uses transmission parameters that are provided for the first PUSCH resource and the second repetition of the control information communication uses transmission parameters that are provided for the second PUSCH resource. In some examples of the method, apparatuses, and non-transitory computer-readable medium described herein, the determining the same number of coded bits further may include operations, features, means, or instructions for calculating a first number of coded bits for the first repetition of the control information communication using the first PUSCH resource, calculating a second number of coded bits for the second repetition of the control information communication using the second PUSCH resource, and selecting the first number of coded bits or the second number of coded bits to be used for both the first repetition and the second repetition of the control information communication.

In some examples of the method, apparatuses, and non-transitory computer-readable medium described herein, a minimum or a maximum of the first number of coded bits or the second number of coded bits may be selected to be used for both the first repetition and the second repetition of the control information communication based on a configuration of the UE. In some examples of the method, apparatuses, and non-transitory computer-readable medium described herein, the number of coded bits associated with the first PUSCH resource or the second PUSCH resource may be selected based on a configuration of the UE.

In some examples of the method, apparatuses, and non-transitory computer-readable medium described herein, an encoding sequence and a rate-matching output sequence associated with the first repetition of the control information communication and the second repetition of the control information communication have a same length that allows for soft combining of multiple repetitions of the control information communication. In some examples of the method, apparatuses, and non-transitory computer-readable medium described herein, the coded bits of the first repetition or the second repetition of the control information communication may be padded with zeros (or ones) when the selected number of coded bits is less than the first number of coded bits or the second number of coded bits, or, and a last number of coded bits of the first repetition or the second repetition of the control information communication may be dropped when the selected number of coded bits is greater than the first number of coded bits or the second number of coded bits.

In some examples of the method, apparatuses, and non-transitory computer-readable medium described herein, the determining the same number of coded bits further may include operations, features, means, or instructions for calculating a first number of coded bits for the first repetition of the control information communication using the first PUSCH resource, mapping the first number of coded bits to a first number of resource elements on the first PUSCH resource, and calculating the second number of coded bits based on the first number of coded bits, where a second number of coded bits of the second number of resource elements is equal to the first number of coded bits.

A method of wireless communication at a UE is described. The method may include receiving, from a base station, configuration information that indicates multiple repetitions of uplink control information communications are to be transmitted to the base station, and that indicates whether a number of coded bits for each uplink control information repetition are to be the same or can be different, determining that a first repetition of an uplink control information communication is to be transmitted in a first uplink communication to the base station, and that a second repetition of the uplink control information communication is to be transmitted in a second uplink communication to the base station, where the first uplink communication and the second uplink communication use one or more of a different modulation and coding scheme or a different number of transmission layers, determining a first number of resource elements for the first repetition independently of a determination of a second number of resource elements for the second repetition responsive to the configuration information indication that the number of coded bits for each uplink control information repetition can be different, determining a same number of coded bits for transmitting each of the first repetition and the second repetition of the uplink control information communication responsive to the configuration information indication that the number of coded bits for each uplink control information repetition are to be the same, and transmitting, to the base station, the first repetition and the second repetition using the determined number of coded bits.

An apparatus for wireless communication at a UE is described. The apparatus may include a processor, memory coupled with the processor, and instructions stored in the memory. The instructions may be executable by the processor to cause the apparatus to receive, from a base station, configuration information that indicates multiple repetitions of uplink control information communications are to be transmitted to the base station, and that indicates whether a number of coded bits for each uplink control information repetition are to be the same or can be different, determine that a first repetition of an uplink control information communication is to be transmitted in a first uplink communication to the base station, and that a second repetition of the uplink control information communication is to be transmitted in a second uplink communication to the base station, where the first uplink communication and the second uplink communication use one or more of a different modulation and coding scheme or a different number of transmission layers, determine a first number of resource elements for the first repetition independently of a determination of a second number of resource elements for the second repetition responsive to the configuration information indication that the number of coded bits for each uplink control information repetition can be different, determine a same number of coded bits for transmitting each of the first repetition and the second repetition of the uplink control information communication responsive to the configuration information indication that the number of coded bits for each uplink control information repetition are to be the same, and transmit, to the base station, the first repetition and the second repetition using the determined number of coded bits.

Another apparatus for wireless communication at a UE is described. The apparatus may include means for receiving, from a base station, configuration information that indicates multiple repetitions of uplink control information communications are to be transmitted to the base station, and that indicates whether a number of coded bits for each uplink control information repetition are to be the same or can be different, determining that a first repetition of an uplink control information communication is to be transmitted in a first uplink communication to the base station, and that a second repetition of the uplink control information communication is to be transmitted in a second uplink communication to the base station, where the first uplink communication and the second uplink communication use one or more of a different modulation and coding scheme or a different number of transmission layers, determining a first number of resource elements for the first repetition independently of a determination of a second number of resource elements for the second repetition responsive to the configuration information indication that the number of coded bits for each uplink control information repetition can be different, determining a same number of coded bits for transmitting each of the first repetition and the second repetition of the uplink control information communication responsive to the configuration information indication that the number of coded bits for each uplink control information repetition are to be the same, and transmitting, to the base station, the first repetition and the second repetition using the determined number of coded bits.

A non-transitory computer-readable medium storing code for wireless communication at a UE is described. The code may include instructions executable by a processor to receive, from a base station, configuration information that indicates multiple repetitions of uplink control information communications are to be transmitted to the base station, and that indicates whether a number of coded bits for each uplink control information repetition are to be the same or can be different, determine that a first repetition of an uplink control information communication is to be transmitted in a first uplink communication to the base station, and that a second repetition of the uplink control information communication is to be transmitted in a second uplink communication to the base station, where the first uplink communication and the second uplink communication use one or more of a different modulation and coding scheme or a different number of transmission layers, determine a first number of resource elements for the first repetition independently of a determination of a second number of resource elements for the second repetition responsive to the configuration information indication that the number of coded bits for each uplink control information repetition can be different, determine a same number of coded bits for transmitting each of the first repetition and the second repetition of the uplink control information communication responsive to the configuration information indication that the number of coded bits for each uplink control information repetition are to be the same, and transmit, to the base station, the first repetition and the second repetition using the determined number of coded bits.

In some examples of the method, apparatuses, and non-transitory computer-readable medium described herein, the first uplink communication uses an uplink control channel resource and the second uplink communication uses a PUSCH resource, and where the first repetition of the uplink control information communication uses transmission parameters that are defined by a format of the uplink control channel and the second repetition of the uplink control information communication uses transmission parameters that are provided for the PUSCH resource.

In some examples of the method, apparatuses, and non-transitory computer-readable medium described herein, a first number of coded bits associated with the first repetition may be determined based on the transmission parameters are defined by the format of the uplink control channel, and a second number of coded bits associated with the second repetition may be determined based on the transmission parameters that are provided for the PUSCH resource irrespective of the first number of coded bits, responsive to the configuration information indication that the number of coded bits for each uplink control information repetition can be different, or, the determined same number of coded bits may be selected from the first number of coded bits or from the second number of coded bits, responsive to the configuration information indication that the number of coded bits for each uplink control information repetition are to be the same.

In some examples of the method, apparatuses, and non-transitory computer-readable medium described herein, the first uplink communication uses a first PUSCH resource and the second uplink communication uses a second PUSCH resource, and where the first repetition of the uplink control information communication uses transmission parameters that are provided for the first PUSCH resource and the second repetition of the uplink control information communication uses transmission parameters that are provided for the second PUSCH resource. In some examples of the method, apparatuses, and non-transitory computer-readable medium described herein, a first number of coded bits associated with the first repetition may be determined based on the transmission parameters that are provided for the first PUSCH resource, and a second number of coded bits may be determined based on the transmission parameters that are provided for the second PUSCH resource irrespective of the first number of coded bits, responsive to the configuration information indication that the number of coded bits for each uplink control information repetition can be different, or, the determined same number of coded bits may be selected from the first number of coded bits or from the second number of coded bits, responsive to the configuration information indication that the number of coded bits for each uplink control information repetition are to be the same.

A method of wireless communication at a base station is described. The method may include determining that a first repetition of a control information communication from a UE is to be received in a first uplink communication, and that a second repetition of the control information communication is to be received in a second uplink communication from the UE, where the first uplink communication and the second uplink communication use one or more of a different modulation and coding scheme or a different number of transmission layers, determining a number of resource elements for each of the first repetition and the second repetition of the control information communication such that each of the first repetition and the second repetition have a same number of coded bits, buffering received signals from the determined number of resource elements of the first repetition in a soft combining buffer, adding received signals from the determined number of resource elements of the second repetition to the soft combining buffer, and decoding the buffered signals in the soft combining buffer to determine the control information communication.

An apparatus for wireless communication at a base station is described. The apparatus may include a processor, memory coupled with the processor, and instructions stored in the memory. The instructions may be executable by the processor to cause the apparatus to determine that a first repetition of a control information communication from a UE is to be received in a first uplink communication, and that a second repetition of the control information communication is to be received in a second uplink communication from the UE, where the first uplink communication and the second uplink communication use one or more of a different modulation and coding scheme or a different number of transmission layers, determine a number of resource elements for each of the first repetition and the second repetition of the control information communication such that each of the first repetition and the second repetition have a same number of coded bits, buffer received signals from the determined number of resource elements of the first repetition in a soft combining buffer, add received signals from the determined number of resource elements of the second repetition to the soft combining buffer, and decode the buffered signals in the soft combining buffer to determine the control information communication.

Another apparatus for wireless communication at a base station is described. The apparatus may include means for determining that a first repetition of a control information communication from a UE is to be received in a first uplink communication, and that a second repetition of the control information communication is to be received in a second uplink communication from the UE, where the first uplink communication and the second uplink communication use one or more of a different modulation and coding scheme or a different number of transmission layers, determining a number of resource elements for each of the first repetition and the second repetition of the control information communication such that each of the first repetition and the second repetition have a same number of coded bits, buffering received signals from the determined number of resource elements of the first repetition in a soft combining buffer, adding received signals from the determined number of resource elements of the second repetition to the soft combining buffer, and decoding the buffered signals in the soft combining buffer to determine the control information communication.

A non-transitory computer-readable medium storing code for wireless communication at a base station is described. The code may include instructions executable by a processor to determine that a first repetition of a control information communication from a UE is to be received in a first uplink communication, and that a second repetition of the control information communication is to be received in a second uplink communication from the UE, where the first uplink communication and the second uplink communication use one or more of a different modulation and coding scheme or a different number of transmission layers, determine a number of resource elements for each of the first repetition and the second repetition of the control information communication such that each of the first repetition and the second repetition have a same number of coded bits, buffer received signals from the determined number of resource elements of the first repetition in a soft combining buffer, add received signals from the determined number of resource elements of the second repetition to the soft combining buffer, and decode the buffered signals in the soft combining buffer to determine the control information communication.

In some examples of the method, apparatuses, and non-transitory computer-readable medium described herein, the first uplink communication uses an uplink control channel resource and the second uplink communication uses a PUSCH resource, and where the first repetition of the control information communication uses transmission parameters that are defined by a format of the uplink control channel and the second repetition of the control information communication uses transmission parameters that are provided for the PUSCH resource. In some examples of the method, apparatuses, and non-transitory computer-readable medium described herein, the determined number of code bits may be selected from a first number of coded bits associated with the first repetition of the control information communication or from a second number of coded bits associated with the second repetition of the control information communication. In some examples of the method, apparatuses, and non-transitory computer-readable medium described herein, a minimum or a maximum of the first number of coded bits or the second number of coded bits may be selected to be used for both the first repetition and the second repetition of the control information communication based on a configuration provided to the UE.

In some examples of the method, apparatuses, and non-transitory computer-readable medium described herein, a number of coded bits associated with the uplink control channel resource or the PUSCH resource may be selected based on a configuration provided to the UE. In some examples of the method, apparatuses, and non-transitory computer-readable medium described herein, the determining the same number of coded bits may include operations, features, means, or instructions for determining a first number of coded bits associated with the uplink control channel resource associated with the first repetition of the control information communication, and where a second number of resource elements associated with the second repetition of the control information communication using the PUSCH resource are determined based on the first number of coded bits.

In some examples of the method, apparatuses, and non-transitory computer-readable medium described herein, the determining the same number of coded bits may include operations, features, means, or instructions for determining a second number of resource elements associated with the PUSCH resource associated with the second repetition of the control information communication, and where a first number of coded bits associated with the first repetition of the control information communication using the uplink control channel resource is determined based on the second number of resource elements.

In some examples of the method, apparatuses, and non-transitory computer-readable medium described herein, the first uplink communication uses a first PUSCH resource and the second uplink communication uses a second PUSCH resource, and where the first repetition of the control information communication uses transmission parameters that are provided for the first PUSCH resource and the second repetition of the control information communication uses transmission parameters that are provided for the second PUSCH resource. In some examples of the method, apparatuses, and non-transitory computer-readable medium described herein, the determined number of coded bits may be selected from a first number of coded bits associated with the first PUSCH resource or from a second number of coded bits associated with the second PUSCH resource.

In some examples of the method, apparatuses, and non-transitory computer-readable medium described herein, a minimum or a maximum of the first number of coded bits or the second number of coded bits may be selected to be used for both the first repetition and the second repetition of the control information communication based on a configuration of the UE. In some examples of the method, apparatuses, and non-transitory computer-readable medium described herein, a number of coded bits associated with the first PUSCH resource or the second PUSCH resource may be selected based on a configuration of the UE.

In some examples of the method, apparatuses, and non-transitory computer-readable medium described herein, the determining the same number of coded bits may include operations, features, means, or instructions for determining a first number of coded bits associated with the first PUSCH resource associated with the first repetition of the control information communication, and where a second number of coded bits associated with the second repetition of the control information communication using the second PUSCH resource is determined based on the first number of coded bits.

A method of wireless communication at a base station is described. The method may include transmitting, to a UE, configuration information that indicates multiple repetitions of uplink control information communications are to be transmitted from the UE to the base station, and that indicates whether a number of coded bits for each uplink control information repetition are to be the same or can be different, determining that a first repetition of an uplink control information communication is to be transmitted in a first uplink communication from the UE, and that a second repetition of the uplink control information communication is to be transmitted in a second uplink communication from the UE, where the first uplink communication and the second uplink communication use one or more of a different modulation and coding scheme or a different number of transmission layers, determining a first number of resource elements for the first repetition independently of a determination of a second number of resource elements for the second repetition responsive to the configuration information indication that the number of resource elements for each uplink control information repetition can be different, determining a same number of coded bits for each of the first repetition and the second repetition of the uplink control information communication responsive to the configuration information indication that the number of coded bits for each uplink control information repetition are to be the same, buffering received signals of the first repetition in a soft combining buffer, adding received signals of the second repetition to the soft combining buffer when the first repetition and the second repetition have the determined same number of coded bits or when a difference between the first number of coded bits and the second number of coded bits is below a threshold value, and decoding the buffered signals in the soft combining buffer to determine the control information communication.

An apparatus for wireless communication at a base station is described. The apparatus may include a processor, memory coupled with the processor, and instructions stored in the memory. The instructions may be executable by the processor to cause the apparatus to transmit, to a UE, configuration information that indicates multiple repetitions of uplink control information communications are to be transmitted from the UE to the base station, and that indicates whether a number of coded bits for each uplink control information repetition are to be the same or can be different, determine that a first repetition of an uplink control information communication is to be transmitted in a first uplink communication from the UE, and that a second repetition of the uplink control information communication is to be transmitted in a second uplink communication from the UE, where the first uplink communication and the second uplink communication use one or more of a different modulation and coding scheme or a different number of transmission layers, determine a first number of resource elements for the first repetition independently of a determination of a second number of resource elements for the second repetition responsive to the configuration information indication that the number of resource elements for each uplink control information repetition can be different, determine a same number of coded bits for each of the first repetition and the second repetition of the uplink control information communication responsive to the configuration information indication that the number of coded bits for each uplink control information repetition are to be the same, buffer received signals of the first repetition in a soft combining buffer, add received signals of the second repetition to the soft combining buffer when the first repetition and the second repetition have the determined same number of coded bits or when a difference between the first number of coded bits and the second number of coded bits is below a threshold value, and decode the buffered signals in the soft combining buffer to determine the control information communication.

Another apparatus for wireless communication at a base station is described. The apparatus may include means for transmitting, to a UE, configuration information that indicates multiple repetitions of uplink control information communications are to be transmitted from the UE to the base station, and that indicates whether a number of coded bits for each uplink control information repetition are to be the same or can be different, determining that a first repetition of an uplink control information communication is to be transmitted in a first uplink communication from the UE, and that a second repetition of the uplink control information communication is to be transmitted in a second uplink communication from the UE, where the first uplink communication and the second uplink communication use one or more of a different modulation and coding scheme or a different number of transmission layers, determining a first number of resource elements for the first repetition independently of a determination of a second number of resource elements for the second repetition responsive to the configuration information indication that the number of resource elements for each uplink control information repetition can be different, determining a same number of coded bits for each of the first repetition and the second repetition of the uplink control information communication responsive to the configuration information indication that the number of coded bits for each uplink control information repetition are to be the same, buffering received signals of the first repetition in a soft combining buffer, adding received signals of the second repetition to the soft combining buffer when the first repetition and the second repetition have the determined same number of coded bits or when a difference between the first number of coded bits and the second number of coded bits is below a threshold value, and decoding the buffered signals in the soft combining buffer to determine the control information communication.

A non-transitory computer-readable medium storing code for wireless communication at a base station is described. The code may include instructions executable by a processor to transmit, to a UE, configuration information that indicates multiple repetitions of uplink control information communications are to be transmitted from the UE to the base station, and that indicates whether a number of coded bits for each uplink control information repetition are to be the same or can be different, determine that a first repetition of an uplink control information communication is to be transmitted in a first uplink communication from the UE, and that a second repetition of the uplink control information communication is to be transmitted in a second uplink communication from the UE, where the first uplink communication and the second uplink communication use one or more of a different modulation and coding scheme or a different number of transmission layers, determine a first number of resource elements for the first repetition independently of a determination of a second number of resource elements for the second repetition responsive to the configuration information indication that the number of resource elements for each uplink control information repetition can be different, determine a same number of coded bits for each of the first repetition and the second repetition of the uplink control information communication responsive to the configuration information indication that the number of coded bits for each uplink control information repetition are to be the same, buffered received signals of the first repetition in a soft combining buffer, add received signals of the second repetition to the soft combining buffer when the first repetition and the second repetition have the determined same number of coded bits or when a difference between the first number of coded bits and the second number of coded bits is below a threshold value, and decode the buffered signals in the soft combining buffer to determine the control information communication.

In some examples of the method, apparatuses, and non-transitory computer-readable medium described herein, the first uplink communication uses an uplink control channel resource and the second uplink communication uses a PUSCH resource, and where the first repetition of the uplink control information communication uses transmission parameters that may be defined by a format of the uplink control channel and the second repetition of the uplink control information communication uses transmission parameters that are provided for the PUSCH resource.

In some examples of the method, apparatuses, and non-transitory computer-readable medium described herein, the first number of coded bits may be determined based on the transmission parameters that are defined by the format of the uplink control channel, and the second number of coded bits may be determined based on the transmission parameters that are provided for the PUSCH resource irrespective of the first number of coded bits, responsive to the configuration information indication that the number of coded bits for each uplink control information repetition can be different, or the determined number of coded bits may be selected from the first number of coded bits or from the second number of coded bits, responsive to the configuration information indication that the number of coded bits for each uplink control information repetition are to be the same.

In some examples of the method, apparatuses, and non-transitory computer-readable medium described herein, the first uplink communication uses a first PUSCH resource and the second uplink communication uses a second PUSCH resource, and where the first repetition of the uplink control information communication uses transmission parameters that are provided for the first PUSCH resource and the second repetition of the uplink control information communication uses transmission parameters that are provided for the second PUSCH resource. In some examples of the method, apparatuses, and non-transitory computer-readable medium described herein, the first number of coded bits may be determined based on the transmission parameters that are provided for the first PUSCH resource, and the second number of coded bits may be determined based on the transmission parameters that are provided for the second PUSCH resource irrespective of the first number of coded bits, responsive to the configuration information indication that the number of coded bits for each uplink control information repetition can be different, or the determined number of coded bits may be selected from the first number of coded bits or from the second number of coded bits responsive to the configuration information indication that the number of coded bits for each uplink control information repetition are to be the same.

DETAILED DESCRIPTION

Figure 1:
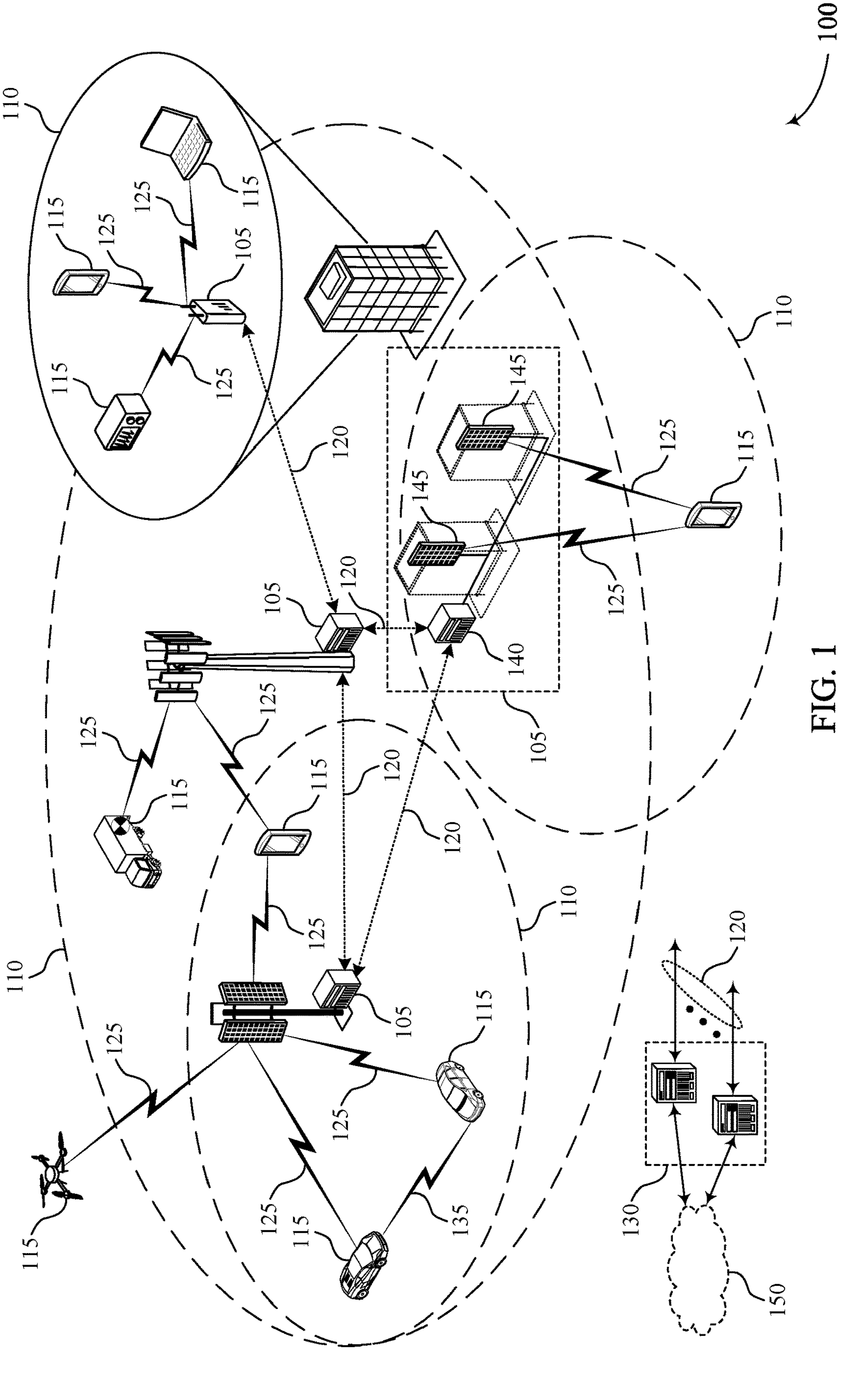
FIG. 1 illustrates an example of a system for wireless communications that supports uplink control information repetition multiplexing with uplink shared channel communications in accordance with aspects of the present disclosure.

A wireless communications system may support communications in a variety of different channel conditions, and may select various transmission parameters based on particular channel conditions that are present between a user equipment (UE) and a base station. In some cases, in the event that a UE has relatively poor channel conditions, one or more communication parameters may be set to help maintain reliable communications in such conditions. In some cases, to help provide for reliable communications over a relatively poor channel, a base station may configure multiple repetitions for certain communications, in order to enhance the likelihood of successful reception of the communication. In some cases, for communications with multiple repetitions, a receiving device may buffer received signals of a first instance of a communication in a soft buffer and may add subsequent received signals of a second instance of the communication to the soft buffer. The aggregate buffered signals may then be used to attempt to decode the communication, which may provide a higher likelihood of successful decoding relative to trying to decode each repetition individually. Such techniques may be referred to as soft combining or soft buffering.

In order for soft combining to provide aggregate buffered signals across multiple repetitions of a communication, each repetition should have a similar or same number of encoded bits that occupy a same amount of resources of a soft buffer, such that multiple repetitions can simply be added into corresponding soft buffer resources. However, in some cases multiple repetitions of a uplink control information (UCI) communication include one or more repetitions that are multiplexed with physical uplink shared channel (PUSCH) communications, and one or more repetitions that are transmitted via a control channel (e.g., a physical uplink control channel (PUCCH)). In cases where UCI is multiplexed with PUSCH, the UCI is transmitted using parameters (e.g., a modulation and coding scheme (MCS), a number of transmission layers, etc.) of the associated PUSCH. Thus, different repetitions of UCI that are multiplexed with different PUSCH communications may be transmitted with different transmission parameters. Likewise, one or more repetitions of UCI transmitted using PUCCH may have different transmission parameters than one or more other repetitions of the UCI that are transmitted with PUSCH. Such different transmission parameters for different repetitions of UCI may prevent a receiving device (e.g., a base station that receives the UCI) from using soft buffering for the UCI.

In accordance with various techniques as discussed herein, transmission of multiple repetitions of UCI may use a same number of coded bits in each repetition, which may allow for soft buffering and combining of the multiple repetitions at receiving device. In some cases, a first repetition of the UCI may be transmitted in PUCCH resources, and a second repetition of the UCI may be multiplexed with a PUSCH communication using PUSCH resources. In some cases, a number of coded bits for each repetition may be selected based on a first number of coded bits of the first repetition transmitted via the PUCCH or based on a second number of coded bits of the second repetition transmitted via PUSCH. Using a same number of coded bits for each repetition of the UCI may allow for a same mother code to be used in an encoding scheme (e.g., polar coding) that is used to encode the UCI, thus allowing for soft combining of the multiple repetitions. In some cases, the UE may encode and perform rate-matching of the UCI based on the PUCCH repetition and then determine a number of resource elements for PUSCH multiplexing, or the UE may encode and perform rate-matching of the UCI based on the PUSCH repetition and then determine a number of resource blocks for the PUCCH repetition.

In other cases, a first repetition of UCI may be transmitted on first PUSCH resources, and a second repetition of the UCI may be transmitted on second PUSCH resources. In some cases, a number of coded bits for each repetition may be selected based on a first number of coded bits of the first repetition transmitted via the first PUSCH or based on a second number of coded bits of the second repetition transmitted via the second PUSCH. In some cases, the UE may encode and perform rate-matching of the UCI based on one of the PUSCH repetitions and then determine a number of resource elements for the other PUSCH multiplexing.

In some cases, a base station may configure a UE to perform UCI multiplexing according to a particular technique such as discussed herein. In some cases, the base station may configure a UE to perform multiplexing of UCI with PUSCH for a repetition of the UCI independently of other repetitions of the UCI that may be transmitted using different transmission parameters (e.g., using a different modulation order). In such cases, the UE may independently process each repetition in accordance with the channel used for the repetition. A base station may select such independent processing when configured PUSCH and PUCCH parameters are similar enough to allow for soft combining of repetitions, based on UE capability, based on one or more channel conditions, or any combinations thereof. In other cases, the base station may configure the UE to process multiple repetitions of UCI to provide a same number of coded bits of the UCI in the different uplink communications, and in some cases also may indicate which channel (e.g., PUSCH or PUCCH, or which PUSCH of two or more repetitions that use PUSCH) is to be used to determine the number of coded bits for the UCI repetitions.

Various aspects of the subject matter described herein may be implemented to realize one or more of the following potential advantages. The techniques employed by the described UEs and base station may provide benefits and enhancements to the operation of a system. For example, described techniques may provide improvements to reliability and efficiency in communications may allowing for soft combining of multiple UCI repetitions, which may increase the likelihood of successfully decoding the UCI. Such improvements may enhance efficiency of wireless communications at a UE by reducing latency and reducing a number of retransmissions of the UCI. In some examples, described techniques may provide flexibility in scheduling communications for a UE and flexibility in whether multiple repetitions of UCI are to use a same number of coded bits, which may provide for more efficient management of communications by a base station or scheduler in the network, among other advantages and benefits.

Aspects of the disclosure are initially described in the context of wireless communications systems. Various examples of multiplexing and coding of repetitions of a transmission are then discussed. Aspects of the disclosure are further illustrated by and described with reference to apparatus diagrams, system diagrams, and flowcharts that relate to uplink control information repetition multiplexing with uplink shared channel communications.

FIG. 1 illustrates an example of a wireless communications system 100 that supports uplink control information repetition multiplexing with uplink shared channel communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As discussed above, in some cases UEs 115 and base stations 105 may transmit multiple repetitions of certain communications, which may enhance the likelihood of successful reception and decoding such communications. In some cases, a base station 105 may configure a UE 115 to transmit multiple repetitions of UCI (e.g., HARQ ACK/NACK information, channel state information (CSI), and the like). In some cases, transmission of multiple repetitions of UCI may use a same number of coded bits in each repetition, which may allow for soft buffering and combining of the multiple repetitions the base station 105 that receives the UCI. While various examples discussed herein relate to UCI repetitions and determination of a same number of coded bits for different repetitions of the UCI, techniques as discussed herein may be used for other types of uplink, downlink, or sidelink communications in which multiple repetitions of a communication may use different transmission parameters.

Figure 2:
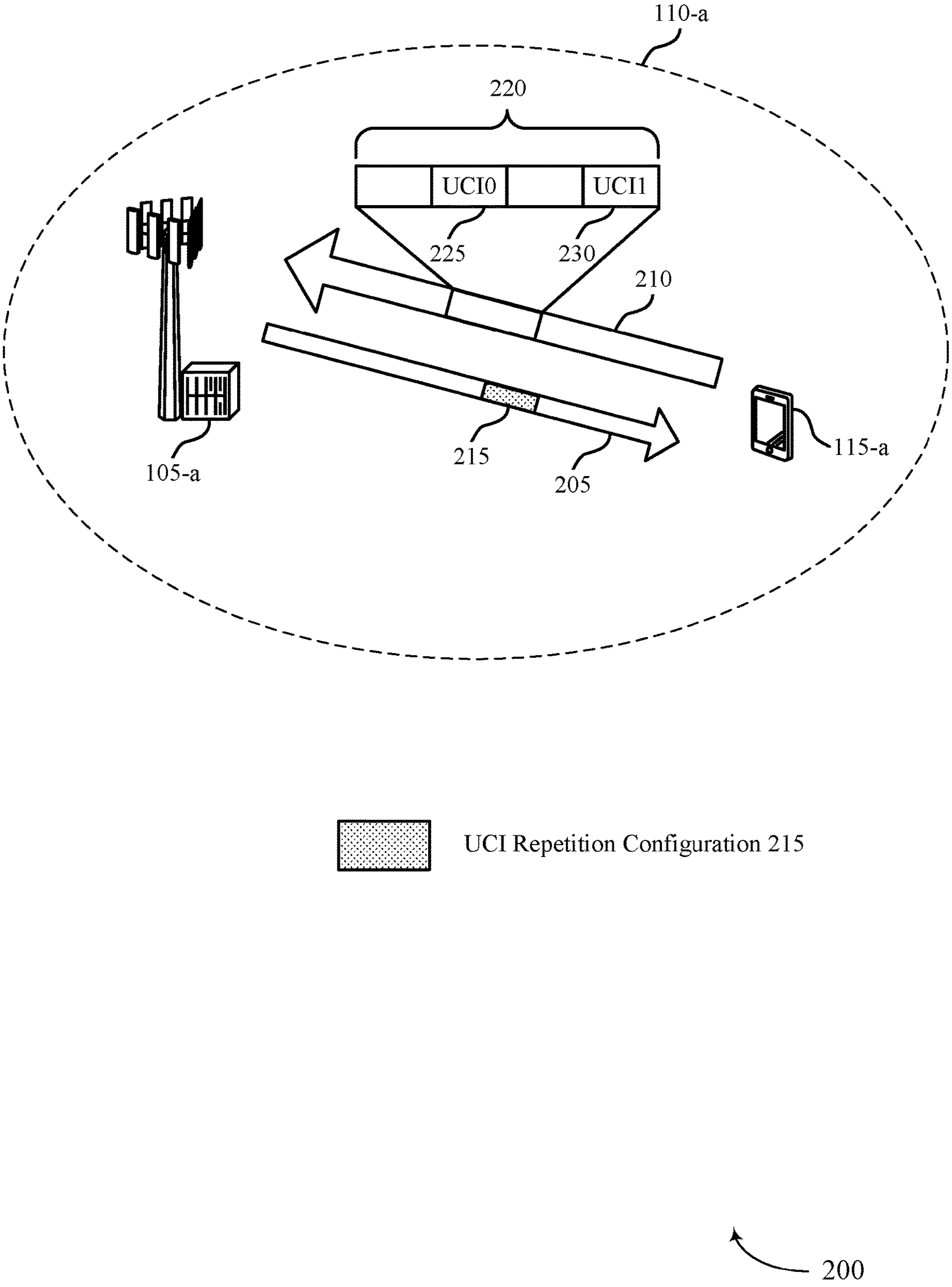
FIG. 2 illustrates an example of a portion of a wireless communications system that supports uplink control information repetition multiplexing with uplink shared channel communications in accordance with aspects of the present disclosure.

FIG. 2 illustrates an example of a wireless communications system 200 that supports uplink control information repetition multiplexing with uplink shared channel communications in accordance with aspects of the present disclosure. In some examples, wireless communications system 200 may implement aspects of wireless communications system 100. The wireless communications system 200 may include base station 105-*a* and UE 115-*a* which may be examples of a base station or UE described above with reference to FIG. 1. Base station 105-*a* and UE 115-*a* may communicate with one another within coverage area 110-*a* using downlink 205 and uplink 210 communications and using techniques described above with reference to FIG. 1. The wireless communications system 200 may provide for repetitions of certain communications in order to enhance the likelihood of successful receipt and decoding of the communications, and thereby enhance system reliability and efficiency.

In the example of FIG. 2, the base station 105-*a* may transmit and the UE 115-*a* may receive configuration information that provides an UCI repetition configuration 215. The UCI repetition configuration 215 may indicate, for example, a number of repetitions of a UCI that are to be transmitted, whether UCI repetitions are to be transmitted using a same number of coded bits, which of multiple repetitions of UCI are to be used for selecting a number of coded bits when the same number of coded bits are to be transmitted, among other configuration information. UCI may include various types of control information that the UE 115-*a* is to transmit to the base station 105-*a*, such as HARQ feedback based on a result of the decoding other downlink communications from the base station 105-*a*, CSI information (e.g., CSI part 1 and CSI part 2 information), one or more status reports or scheduling requests, uplink reference signals, or any combinations thereof. In the event that the UCI is not successfully received at the base station 105-*a*, the UE 115-*a* may be triggered to provide a retransmission of the UCI. In such examples, it may be desirable to reduce a quantity of retransmissions that occur as part of the HARQ process to ensure latency or reliability targets are satisfied. To that end, techniques as discussed herein may provide for enhanced likelihood of successful reception and decoding of transmissions, and thereby reduce the likelihood that a UCI communication will need to be retransmitted. In this example, the UE 115-*a* may be allocated with uplink resources 220 which may include resources for multiple repetitions of UCI, including a first UCI repetition 225 (UCI0) and a second UCI repetition 230 (UCI1).

In some cases, the first UCI repetition 225 and the second UCI repetition 230 may each use PUCCH, and be transmitted using a same set of transmission parameters that are used for PUCCH communications. In such cases, the multiple UCI repetitions may be buffered at the base station 105-*a* to combine the multiple repetitions and provide enhanced likelihood of successful decoding of the buffered UCI. In cases where one or more of the repetitions are multiplexed on one or more PUSCHs, a number of coded bits for the UCI repetitions may be determined in accordance with techniques as discussed herein. Such determinations may include determination of a number of resource elements (REs) to be used for each UCI repetition on the one or more PUSCHs, which in turn determines a rate matching output sequence length (E). Such determinations may also include determination of a number of resource blocks (RBs) in a PUCCH resource (e.g., for PUCCH formats 2 and 3) if at least one of the UCI repetitions are transmitted in a PUCCH resource, which determines the number of REs in the PUCCH resource and rate matching output sequence length (E).

Figure 3:
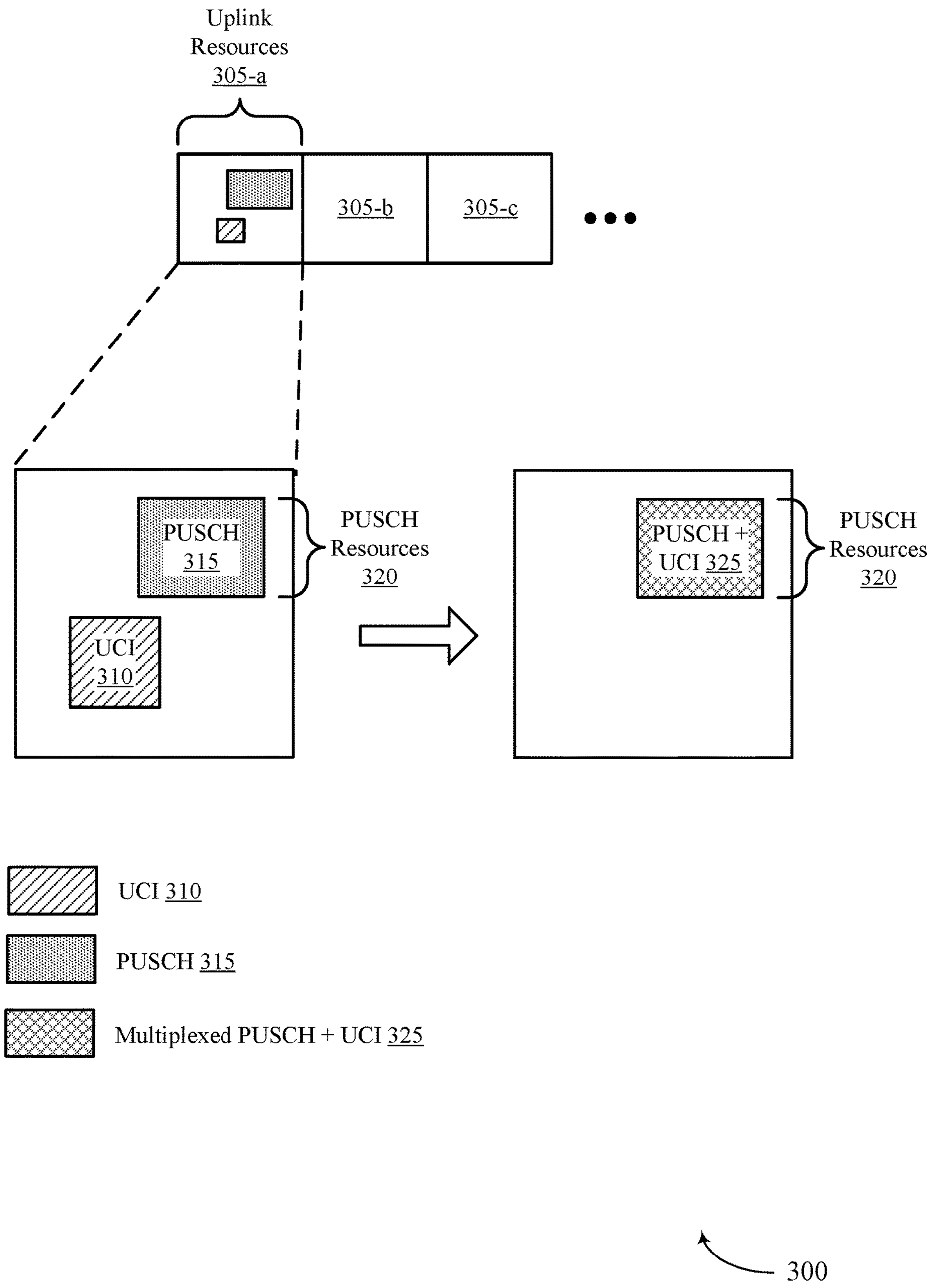
FIG. 3 illustrates an example of uplink resources with UCI and PUSCH that support uplink control information repetition multiplexing with uplink shared channel communications in accordance with aspects of the present disclosure.

FIG. 3 illustrates an example of a uplink resources with UCI and PUSCH 300 that supports UCI repetition multiplexing with uplink shared channel communications in accordance with aspects of the present disclosure. In some examples, uplink resources with UCI and PUSCH 300 may implement aspects of wireless communications system 100 or 200. In this example, a number of uplink resources 305 may be allocated for uplink communications from a UE (e.g., a UE 115 of FIG. 1 or 2) to a base station (e.g., a base station 105 of FIG. 1 or 2).

In a set of first uplink resources 305-*a*, the UE may have UCI 310 that is to be transmitted, and may also have an allocation of PUSCH resources 320 for a PUSCH communication 315. In such cases, the UCI 310 may be multiplexed with the PUSCH communication 315 to generate a multiplexed PUSCH and UCI communication 325 that is transmitted in PUSCH resources 320. Such multiplexing may be performed in accordance with multiplexing rules that are defined to resolve collision (i.e., time overlap) between different uplink channels for the PUCCH and PUSCH communications. Such different communications may include, for example, PUCCH for HARQ-ACK plus PUCCH for scheduling request (SR), PUCCH for HARQ-ACK plus PUCCH for CSI, PUCCH for SR plus PUCCH for CSI, or PUCCH for HARQ-ACK plus PUCCH for CSI plus PUCCH for SR. In each of these cases, multiple UCI may be multiplexed on one PUCCH or on PUSCH. In cases where one of the colliding channels is PUSCH, the UCI may be multiplexed on PUSCH based on a Beta offset that is signaled in a uplink grant (e.g., in DCI format 0_1) for the PUSCH or that is configured (e.g., via a RRC parameter). The Beta offset may be used to control the rate matching behavior (i.e., how to multiplex PUCCH on PUSCH) and may be used to derive a number of resources that UCI payload can occupy on PUSCH. The number of resources that UCI can occupy may impact a number of coded bits. An example of a process for UCI multiplexing on PUSCH is discussed with reference to FIG. 4.

Figure 4:
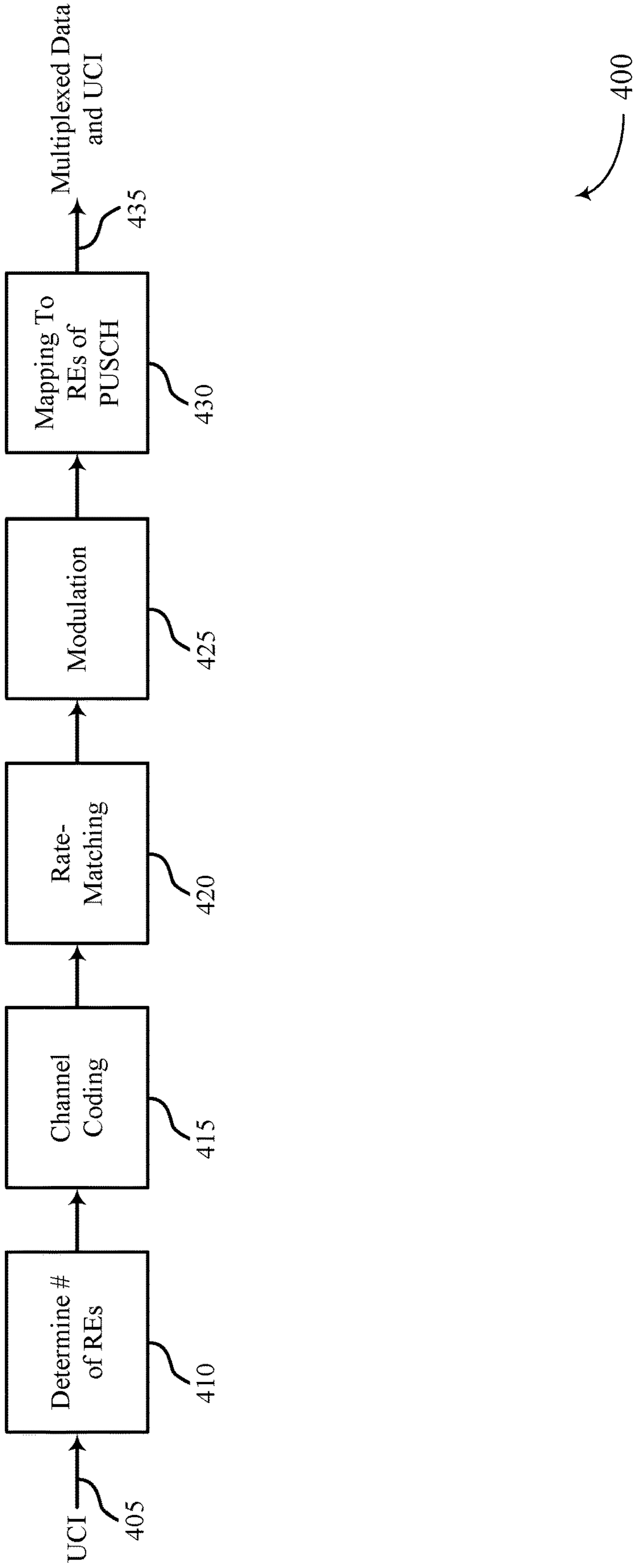
FIG. 4 illustrates an example of a encoding and multiplexing scheme that supports uplink control information repetition multiplexing with uplink shared channel communications in accordance with aspects of the present disclosure.

FIG. 4 illustrates an example of a encoding and multiplexing scheme 400 that supports UCI repetition multiplexing with uplink shared channel communications in accordance with aspects of the present disclosure. In some examples, encoding and multiplexing scheme 400 may implement aspects of wireless communications system 100 or 200.

As discussed, in some cases one or more repetitions of UCI may be multiplexed with uplink data in a PUSCH communication from a UE (e.g., a UE 115 of FIG. 1 or 2) to a base station (e.g., a base station 105 of FIG. 1 or 2). The determination of the PUSCH resources over which UCI is to be multiplexed may be based on various configuration parameters and the UCI itself. In this example, UCI 405 may be identified at a UE, and at 410, the UE may determine a number of resource elements are in the PUSCH for UCI transmission. This determines a number of bits for output of rate-matching and also determined a mother code length for encoding (e.g., for polar coding). The UE may then perform channel coding at 415, followed by rate-matching at 420 and modulation at 425. Then, at 430, the modulated symbols of UCI are mapped to some of the REs of PUSCH to generate multiplexed data and UCI 435. RE mapping may be based on a set of rules, and may depend on UCI type(s), PUSCH demodulation reference signal (DMRS) symbol location, and the like. These steps are performed for each UCI that overlaps with the PUSCH (i.e. first for HARQ-ACK/NACK information (if present), then for CSI part 1 (if present), then for CSI part 2 (if present)). The transmitted UCI in such cases uses a same modulation order and a same number of layers as the PUSCH communication (which are indicated in a DCI that schedules the PUSCH).

When determining the number of resource elements at 410, the UE may determine a quantity Q', which is the number of coded modulation symbols per layer (i.e. number of REs for UCI), and is determined first for HARQ-ACK/NAK, then CSI part 1, then CSI part 2. For HARQ ACK/NACK information the quantity Q' may be determined, in cases where uplink data is also transmitted using PUSCH, based on the following formula:

$$Q'_{ACK} = \min\left\{\left\lceil\frac{(O_{ACK}+L_{ACK})\cdot\beta_{offset}^{PUSCH}\cdot\sum_{l=0}^{N_{symb,all}^{PUSCH}-1}M_{sc}^{UCI}(l)}{\sum_{r=0}^{C_{UL\text{-}SCH}-1}K_r}\right\rceil,\ \left\lceil\alpha\cdot\sum_{l=l_0}^{N_{symb,all}^{PUSCH}-1}M_{sc}^{UCI}(l)\right\rceil\right\}$$

where the quantity $(O_{ACK}+L_{ACK})$ corresponds to the HARQ ACK/NACK payload size. The quantity for $$\beta_{offset}^{PUSCH}$$

is a value that is configured at the UE (e.g., via RRC signaling or dynamically indicated in the DCI scheduling the PUSCH) that controls the spectral efficiency ratio of PUSCH to UCI. The quantity for $$\sum_{l=0}^{N_{symb,all}^{PUSCH}-1}M_{sc}^{UCI}(l)$$

corresponds to the total number of PUSCH REs. The quantity for $$\sum_{r=0}^{C_{UL\text{-}SCH}-1}K_r$$

corresponds to the number of coded bits for uplink data (i.e., uplink shared channel (UL-SCH) bits). The quantity for a corresponds to a scaling factor to limit the number of REs assigned to UCI on PUSCH, and the quantity for $$\sum_{l=l_0}^{N_{symb,all}^{PUSCH}-1}M_{sc}^{UCI}(l)$$

corresponds to a maximum number of REs that can be used for UCI.

In cases where the UCI is to be transmitted using PUSCH and uplink data is not transmitted using PUSCH, the quantity Q' For HARQ ACK/NACK information may be determined based on the following formula:

$$Q'_{ACK} = \min\left\{\left\lceil\frac{(O_{ACK}+L_{ACK})\cdot\beta_{offset}^{PUSCH}}{R\cdot Q_m}\right\rceil,\ \left\lceil\alpha\cdot\sum_{l=l_0}^{N_{symb,all}^{PUSCH}-1}M_{sc}^{UCI}(l)\right\rceil\right\}$$

in which the quantities used in the formula correspond to the same quantities discussed above for cases where uplink data is transmitted in the PUSCH. In this case, the quantity for the total number of PUSCH REs is not present, and the quantity for the number of coded bits for uplink data (UL-SCH) is replaced with $R\cdot Q_m$, where R corresponds to the code rate of the PUSCH and $Q_m$ correspond to the modulation order of the PUSCH.

In cases where the UCI includes CSI part 1 information to be transmitted using PUSCH, and in cases where UCI includes both CSI part 1 and CSI part 2 information, values for Q' may be determined in a similar manner, with the a maximum number of REs that can be used for UCI (as scaled by the quantity a) adjusted to account for the number of coded modulation symbols for the HARQ ACK/NACK information (i.e., $Q'_{ACK}$) and, for CSI part 2 information, adjusted to account for both HARQ ACK/NACK and CSI part 1 information.

In cases where a UCI repetition is not multiplexed on PUSCH (i.e., PUCCH does not overlap in time with PUSCH), the UCI repetition may by transmitted on PUCCH resources. In such cases, a number of REs for UCI may be based on PUCCH REs (excluding DMRS) in the PUCCH resource after determining the number of RBs that are available for the PUCCH. The number of RBs that are available for PUCCH may be determined, in some cases, based on a PUCCH format (e.g., a PUCCH format that is configured for more than one RB), and in cases where more than one RB is configured the actual number of RBs may be calculated based on UCI payload size and maximum code rate configured for the PUCCH format such that the actual number of RBs for PUCCH repetitions, $$M_{RB,min}^{PUCCH},$$

is smaller or equal to a configured number of RBs (e.g., as configured by the RRC parameter "nrofPRBs") but is also enough to accommodate the payload.

Figure 5:
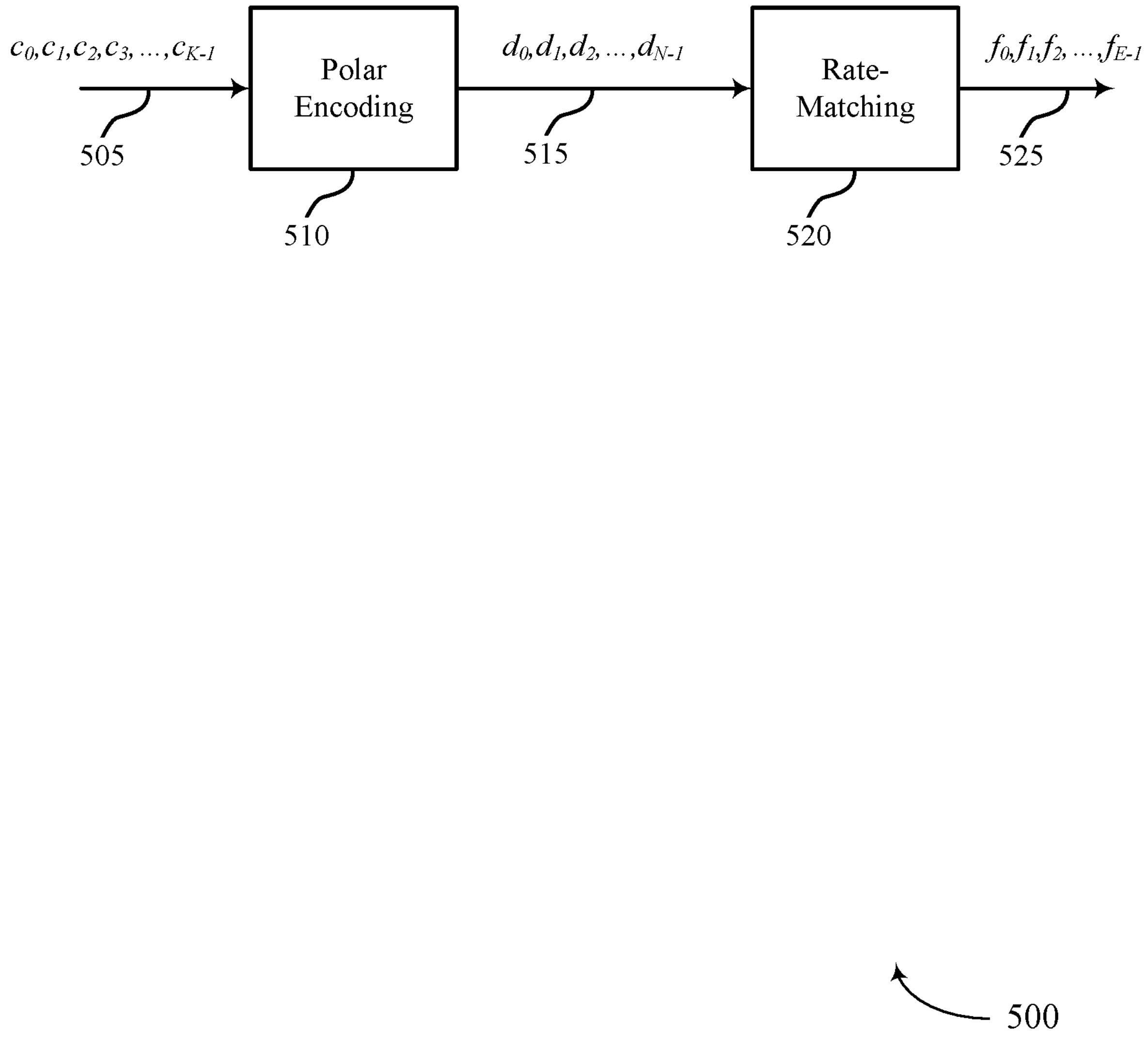
FIG. 5 illustrates an example of a polar encoding scheme that supports uplink control information repetition multiplexing with uplink shared channel communications in accordance with aspects of the present disclosure.

FIG. 5 illustrates an example of a polar encoding scheme 500 that supports UCI repetition multiplexing with uplink shared channel communications in accordance with aspects of the present disclosure. In some examples, polar encoding scheme 500 may implement aspects of wireless communications system 100 or 200. In this example, UCI may be encoded using a polar coding scheme such as used in 5G NR systems in which polar coding may be used for UCI in cases where the UCI includes more than 11 bits.

In this example, incoming UCI information bits 505, corresponding to K bits identified as $c_0$ through $c_{K-1}$, are provided to a polar encoding function 510. The polar encoding function 510 outputs N coded bits 515, corresponding to bits $d_0$ through $d_{N-1}$. The quantity N in such cases is a power of 2 and corresponds to a mother code size length. Nis determined as a function of quantities K and E, where E is the rate-matching output sequence length and is determined from an actual number of REs used for UCI (either on PUCCH or PUSCH). The value of N may be determined, in some cases, based on $N_{max}$=1024, a value of $N_2$ which is a smallest power of 2 that is greater than or equal to 8K, and a value of $N_1$. The value of $N_1$ is based on $N_{1temp}$ which is the smallest power of 2 that is greater than or equal to E, where $N_1=N_{1temp}/2$ if $16/9E \leq N_{1temp}$ and $K/E<9/16$, or $N_{1temp}$ otherwise. The value of Nis then set as N=min $\{N_1, N_2, N_{max}\}$. The N coded bits 515 are provided to rate-matching function 520 that maps the coded bits to REs for transmission and provides a rate matching output sequence 525 having a length of E bits, thus providing output bits $f_0$ through $f_{E-1}$. As indicated above, E is the rate matching output sequence length and is determined from actual number of REs used for UCI (either on PUCCH or on PUSCH). Rate matching may include repetition of coded bits (from a circular buffer) when E>N, puncturing of the coded bits if $K*16/7 \leq E<N$, or shortening the coded bit sequence otherwise.

Figure 6:
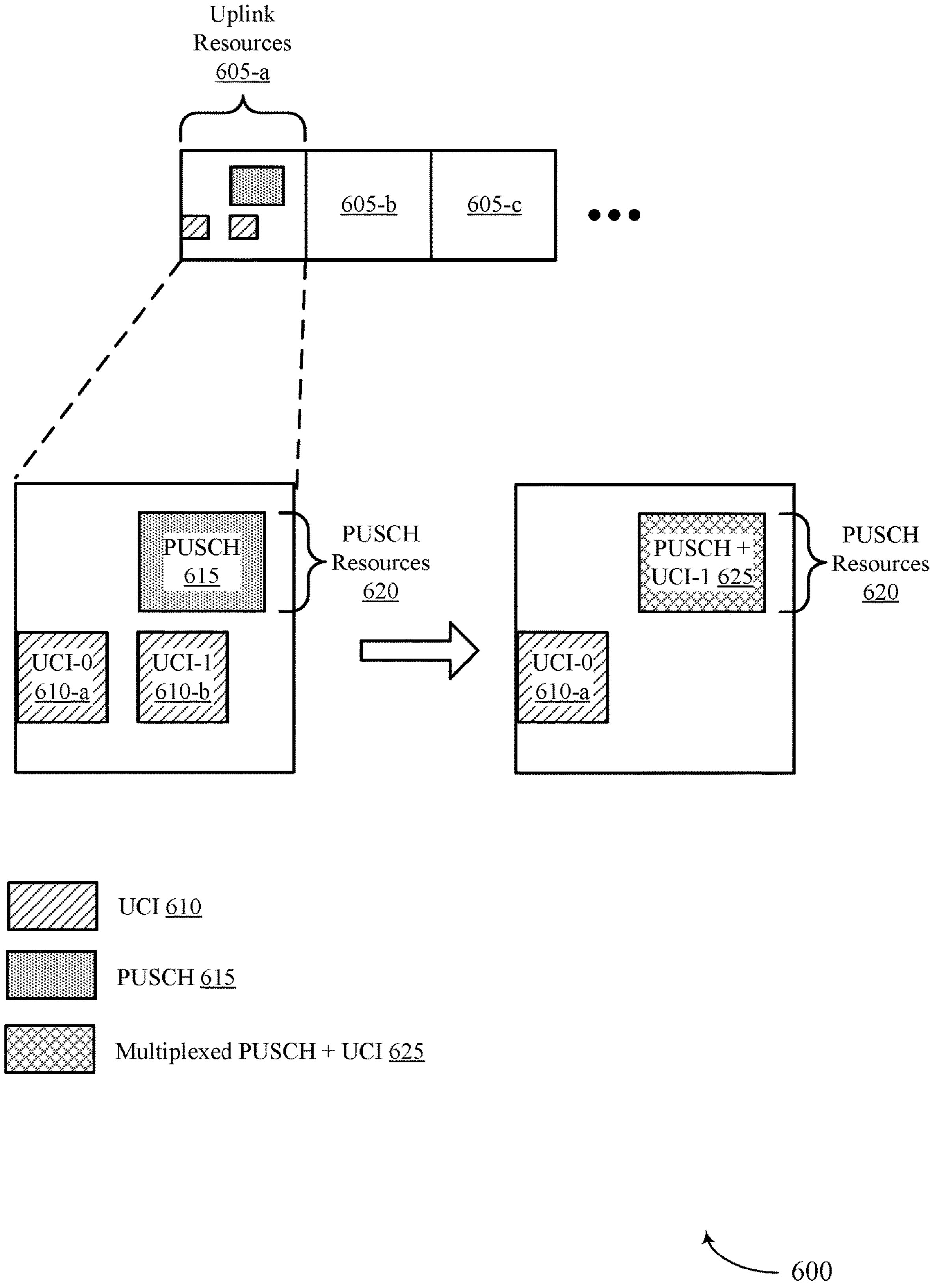
FIG. 6 illustrates an example of UCI repetitions with PUSCH multiplexing in accordance with aspects of the present disclosure.

FIG. 6 illustrates an example of a UCI repetitions with PUSCH multiplexing 600 that supports UCI repetition multiplexing with uplink shared channel communications in accordance with aspects of the present disclosure. In some examples, UCI repetitions with PUSCH multiplexing 600 may implement aspects of wireless communications system 100 or 200. In this example, a number of uplink resources 605 may be allocated for uplink communications from a UE (e.g., a UE 115 of FIG. 1 or 2) to a base station (e.g., a base station 105 of FIG. 1 or 2).

In first uplink resources 605-*a*, the UE may have multiple repetitions of UCI 610 that is to be transmitted, including a first UCI repetition 610-*a* (for UCI-0) and a second UCI repetition 610-*b* (for UCI-1). In this example the UE may also have an allocation for PUSCH resources 620 for a PUSCH communication 615. Thus, in this example, the first UCI repetition 610-*a* would be transmitted using PUCCH resources (e.g., PUCCH resources that are configured for UE use for transmission of UCI repetitions in the event that PUSCH is not transmitted), and the second UCI repetition 610-*b* is to be multiplexed with PUSCH 615 based on overlapping in time with the PUSCH resources 620 to generate multiplexed PUSCH plus UCI 625.

In order to allow for soft combining of the multiple UCI 610 repetitions, techniques as discussed herein may be used to provide that a same number of coded bits are provided in each UCI 610 repetition. In some cases, the UE may force the use of the same value of E (i.e., the number of coded bits after rate matching) for each repetition on PUCCH and PUSCH, which results in the same mother code length (i.e., same value of N and thus a same bit sequence of the encoded bits) at the encoder. In some cases, the UE may determine the number of coded bits for the first UCI repetition 610-*a* on the PUCCH resource (i.e., a value for $E_1$) by determining $$M_{RB,min}^{PUCCH},$$

which is the actual number of RBs for the PUCCH repetitions, as discussed above with reference to FIG. 4, based on a maximum code rate for PUCCH (r), a number of subcarriers per RB for control $$(N_{SC,ctrl}^{RB})$$

excluding DMRS, a number of symbols for control $$(N_{symb-UCL}^{PUCCH})$$

excluding DMRS, the modulation order ($Q_m$) for PUCCH, and number of UCI bits (K, which is the same for both UCI 610 repetitions), and the number of RBs "nrofPRBs" configured for the PUCCH resource(s). The value of $E_1$ may be determined based on the actual number of RBs for the PUCCH resource according to:

$$E_1 = M_{RB,min}^{PUCCH} \cdot N_{SC,ctrl}^{RB} \cdot N_{symb-UCL}^{PUCCH} \cdot Q_m.$$

The UE may also determine the number of coded bits for the second UCI repetition 610-*b* on the PUSCH resource (i.e., a value for $E_2$) by determining Q', which is the number of coded modulation symbols per layer (i.e., number of REs for UCI) for the PUSCH as described with reference to FIG. 4, based on UCI 610 payload size, the BetaOffset $$(\beta_{offset}^{PUSCH}),$$

total number of PUSCH REs ($Q_{m,PUSCH}$), the number of coded bits for uplink shared channel (UL-SCH) data, a scaling factor to limit the number of REs assigned to UCI on PUSCH, and maximum number of REs can be used for UCI on PUSCH. The value of $E_2$ may be determined based on:

$$Q'\colon E_2 = Q' \cdot Q_{m,PUSCH} \cdot \sharp \text{ of layers.}$$

The UE may then determine one value for E, based on $E_1$ and $E_2$. In some cases, the value of E may be selected based on the smallest of $E_1$ and $E_2$ (i.e., E=min $(E_1,E_2)$), and may be used for determining mother code and rate matching output sequence. In other cases, the value of E may be selected as a largest of Er and $E_2$ (i.e., E=max $(E_1,E_2)$), and this value of E may be used for determining mother code length and rate matching output sequence. In other cases, the value of E may be determined based on the UCI repetition on PUCCH (i.e., $E=E_1$), or the value of E may be determined based on the UCI repetition on PUSCH (i.e., $E=E_2$). In some cases, the UE may be configured by the base station to determine the value of E based on one of these options. Once the value of E is selected, it may be used for determining a mother code length (for encoding) and a rate matching output sequence, such as described with reference to FIG. 5.

In some cases, one of the UCI 610 repetitions may have a corresponding value of $E_1$ or $E_2$ that is greater than the selected E, and in such a case zeros (or ones) may be inserted to pad the UCI (e.g., if $E_2>E=E_1$, the coded bits corresponding to the second UCI repetition 610-*b* are set to be $E=E_1$ bits based on output of rate matching plus $E_2-E_1$ zero bits). In some cases, one of the UCI 610 repetitions may have a corresponding value of $E_1$ or $E_2$ that is less than the selected E, and in such a case, the last $E-E_1$ coded bits from the output of rate matching may be dropped and not transmitted (e.g., if $E_2<E_1=E$, the coded bits corresponding to the second UCI repetition 610-*b* may include the first $E_2$ bits of the E bits of the rate matching output sequence).

In some cases, the base station may configure a UE to perform rate matching for UCI repetitions to allow for soft combining of repetitions through providing a same number of coded bits after rate-matching (i.e., a same value for E). In other cases, the base station may configure the UE to independently determine the actual number of RBs and the number of coded modulation symbols per layer, encoding, and rate matching for the PUCCH and PUSCH (i.e., values of E may be determined independently for each UCI 610 repetition, irrespective of values of other repetitions). In such cases, the base station may perform scheduling and configure PUSCH and PUCCH transmission parameters to provide that the number of REs for each UCI 610 repetition are relatively close such that soft combining may be used. In other cases, the base station may simply decode each repetition individually if they have separate mother code rates. In some cases, the base station may make such a determination based on data that is to be transmitted by the UE, indicated UE capabilities or a UE request, or any combinations thereof.

In other cases, the UE may be configured to perform encoding and rate matching based on PUCCH, and then determine the number of REs for UCI multiplexing on PUSCH 615. In such cases, the UE may determine the values for $E_1$ and $E_2$ as discussed above, and then may perform encoding and rate matching based on $E_1$, and map the coded bits from the output of rate matching to the REs of the PUCCH resource. The UE may calculate the number of coded modulation symbols per layer (i.e. number of REs for UCI, Q') for the second repetition of UCI 610-*b* on the PUSCH 615 based on $E_1$: $Q'=E_1/(Q_{m,PUSCH}\cdot\#$ of layers), and use Q' REs of the PUSCH REs for multiplexing the second UCI repetition 610-*b* (in which cases, the BetaOffset and the procedures discussed with reference to FIG. 4 are not used to determine Q').

In other cases, the UE may be configured to perform encoding and rate matching based on PUSCH, and then determine actual number of RBs for the PUCCH resource. In such cases, the UE may determine the values for $E_1$ and $E_2$ as discussed above, and then may perform encoding and rate matching based on $E_2$, and map the coded bits from the output of rate matching to the REs of the PUSCH. The UE may calculate actual number of RBs for the PUCCH resource based on $E_2$, as:

$$M_{RB,min}^{PUCCH}=E_2\Big/\left(N_{SC,ctrl}^{RB}\cdot N_{symb-UCL}^{PUCCH}\cdot Q_m\right).$$

In such cases, the value or r (maximum code rate) and the procedures discussed with reference to FIG. 4 are not used to determine $$M_{RB,min}^{PUCCH}.$$

Figure 7:
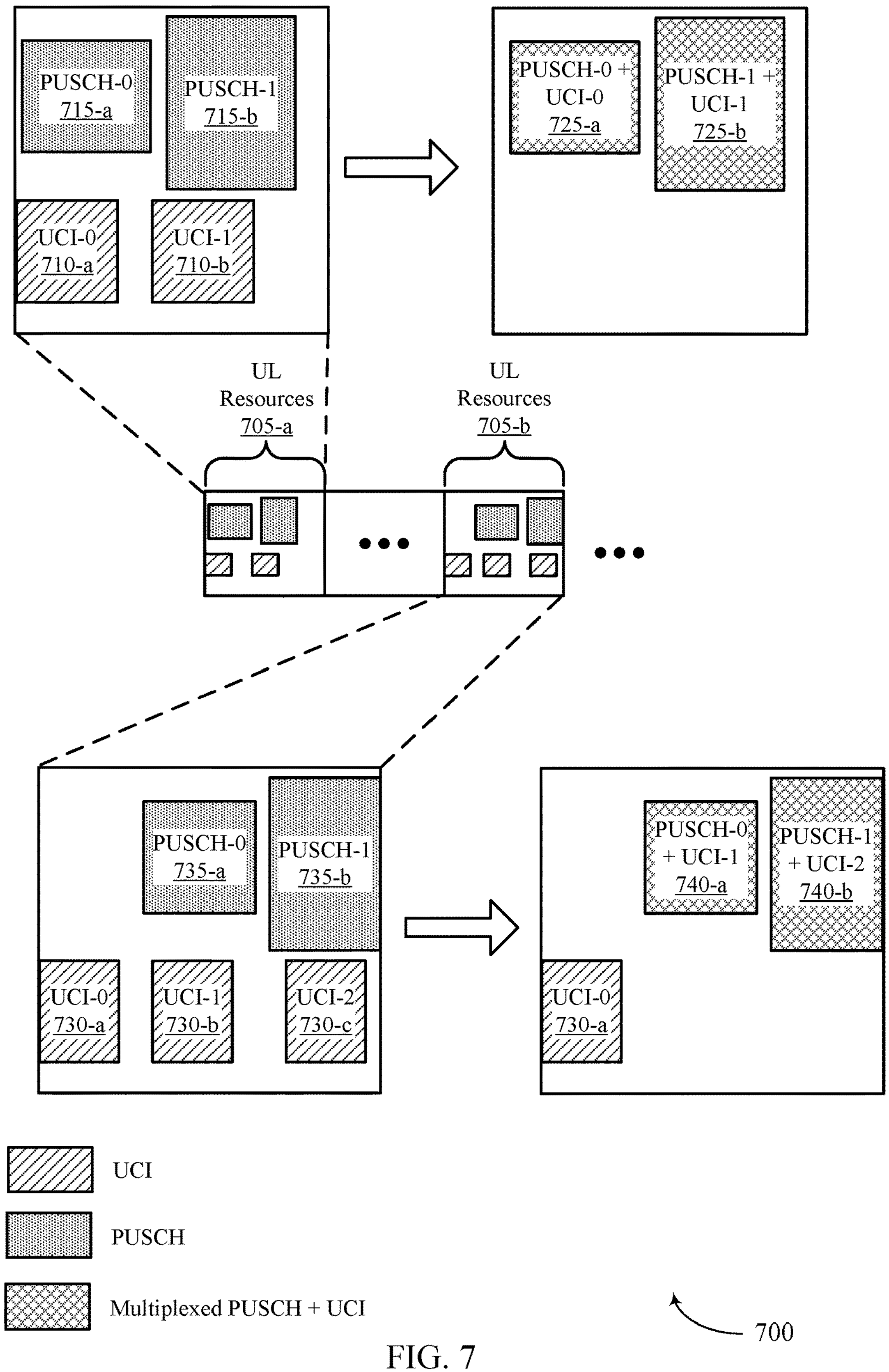
FIG. 7 illustrates further examples of UCI repetitions with PUSCH multiplexing in accordance with aspects of the present disclosure.

FIG. 7 illustrates further examples of UCI repetitions with PUSCH multiplexing 700 that support UCI repetition multiplexing with uplink shared channel communications in accordance with aspects of the present disclosure. In some examples, UCI repetitions with PUSCH multiplexing 700 may implement aspects of wireless communications system 100 or 200. In this example, a number of uplink resources 705 may be allocated for uplink communications from a UE (e.g., a UE 115 of FIG. 1 or 2) to a base station (e.g., a base station 105 of FIG. 1 or 2).

In first uplink resources 705-*a*, the UE may have multiple repetitions of UCI 710 that is to be transmitted, including a first UCI repetition 710-*a* (for UCI-0) and a second UCI repetition 710-*b* (for UCI-1). In this example the UE may also have multiple allocations for PUSCH communications 715, including a first PUSCH 715-*a* and a second PUSCH 715-*b* which are overlapping in time, respectively, with the first UCI repetition 710-*a* and the second UCI repetition 710-*b*. Thus, in this example, the first UCI repetition 710-*a* may be multiplexed with the first PUSCH 715-*a*, and the second UCI repetition 710-*b* may be multiplexed with second PUSCH 715-*b* to generate, respectively, first multiplexed PUSCH plus UCI 725-*a* and second multiplexed PUSCH plus UCI 725-*b*.

In order to allow for soft combining of the multiple UCI 710 repetitions, techniques as discussed herein may be used to provide that a same number of coded bits are provided in each UCI 710 repetition. In some cases, the UE may force the use of the same value of E (i.e., the number of coded bits after rate matching) for each UCI repetition 610 of PUSCH, which results in the same mother code length (i.e., same value of N and thus a same bit sequence of the encoded bits) at the encoder. In some cases, the UE may determine the number of coded bits for the first UCI repetition 710-*a* on the first PUSCH 715-*a* resource (i.e., a value for $E_1$) by determining $Q'_1$, which is the number of coded modulation symbols per layer (i.e., number of REs for UCI) for the PUSCH as described with reference to FIG. 4, based on UCI 710 payload size, the BetaOffset $$(\beta_{offset}^{PUSCH}),$$

total number of PUSCH REs ($Q_{m,PUSCH,1}$), the number of coded bits for uplink shared channel (UL-SCH) data, a scaling factor to limit the number of REs assigned to UCI on PUSCH, and maximum number of REs can be used for UCI on the first PUSCH 715-*a*. The value of $E_1$ may be determined based on:

$$Q':E_1=Q'_1\cdot Q_{m,PUSCH,1}\cdot\#\text{ of layers for the first }PUSCH.$$

The UE may also determine the number of coded bits for the second UCI repetition 710-*b* on the second PUSCH 715-*b* resource (i.e., a value for $E_2$) by determining $Q'_2$, which is the number of coded modulation symbols per layer (i.e., number of REs for UCI) for the second PUSCH 715-*b* as described with reference to FIG. 4, based on UCI 710 payload size, the BetaOffset $(\beta_{offset}^{PUSCH})$, total number of PUSCH REs ($Q_{m,PUSCH,2}$), the number of coded bits for uplink shared channel (UL-SCH) data, a scaling factor to limit the number of REs assigned to UCI on PUSCH, and maximum number of REs can be used for UCI 710 on second PUSCH 710-*b*. The value of $E_2$ may be determined based on:

$$Q_2': E_2 = Q_2' \cdot Q_{m,PUSCH,2} \cdot \# \text{ of layers for the second } PUSCH.$$

The UE may then determine one value for E, based on $E_1$ and $E_2$. In some cases, the value of E may be selected based on the smallest of $E_1$ and $E_2$ (i.e., E=min $(E_1,E_2)$), and may be used for determining mother code length and rate matching output sequence. In other cases, the value of E may be selected as a largest of $E_1$ and $E_2$ (i.e., E=max $(E_1,E_2)$), and this value of E may be used for determining mother code length and rate matching output sequence. In other cases, the value of E may be determined based on the UCI repetition on the first PUSCH 715-*a* (i.e., $E=E_1$), or the value of E may be determined based on the UCI repetition on the second PUSCH 715-*b* (i.e., $E=E_2$). In some cases, the UE may be configured by the base station to determine the value of E based on one of these options. Once the value of E is selected, it may be used for determining a mother code (for encoding) and a rate matching output sequence, such as described with reference to FIG. 5.

In some cases, one of the UCI 710 repetitions may have a corresponding value of $E_1$ or $E_2$ that is greater than the selected E, and in such a case zeros (or ones) may be inserted to pad the UCI (e.g., if $E_2>E=E_1$, the coded bits corresponding to the second UCI repetition 710-*b* are set to be $E=E_1$ bits based on output of rate matching plus $E_2-E_1$ zero bits). In some cases, one of the UCI 710 repetitions may have a corresponding value of $E_1$ or $E_2$ that is less than the selected E, and in such a case, the last $E-E_1$ coded bits from the output of rate matching may be dropped and not transmitted (e.g., if $E_2<E_1-E$, the coded bits corresponding to the second UCI repetition 710-*b* may include the first $E_2$ bits of the E bits of the rate matching output sequence).

In some cases, the base station may configure a UE to perform rate matching for UCI repetitions to allow for soft combining of repetitions through providing a same number of coded bits after rate-matching (i.e., a same value for E). In other cases, the base station may configure the UE to independently determine the actual number of coded modulation symbols per layer, encoding, and rate matching for both the first PUSCH 715-*a* and the second PUSCH 715-*b* (i.e., values of E may be determined independently for each UCI 710 repetition, irrespective of values of other repetitions). In such cases, the base station may perform scheduling and configure PUSCH transmission parameters to provide that the number of REs for each UCI 710 repetition are relatively close such that soft combining may be used. In other cases, the base station may simply decode each repetition individually if they have separate mother code rates. In some cases, the base station may make such a determination based on data that is to be transmitted by the UE, indicated UE capabilities or a UE request, or any combinations thereof.

In other cases, the UE may be configured to perform encoding and rate matching based on either the first PUSCH 715-*a* or the second PUSCH 715-*b*, and then determine the number of REs for UCI multiplexing on the other PUSCH 715. In such cases, the UE may determine the values for one of $E_1$ or $E_2$ as discussed above, and then may perform encoding and rate matching based on the selected value of E, and map the coded bits from the output of rate matching to the REs of the corresponding PUSCH resource. The UE may calculate the number of coded modulation symbols per layer (i.e. number of REs for UCI, Q') for the other repetition of UCI 710 based on $E_1$: $Q'=E_i/(Q_{m,PUSCH,i}\cdot\#$ of layers), and use Q' REs of the PUSCH REs for multiplexing the other UCI repetition 710 (in which cases, the BetaOffset and the procedures discussed with reference to FIG. 4 are not used to determine Q').

In further cases, three (or more) repetitions of UCI may be transmitted. For example, in second uplink resources 705-*b*, three repetitions of UCI 730 may be transmitted, including a first UCI repetition 730-*a* (for UCI-0), a second UCI repetition 730-*b* (for UCI-1), and a third UCI repetition 730-*c* (for UCI-2). In this example the UE may also have multiple allocations for PUSCH communications 735, including a first PUSCH 735-*a* and a second PUSCH 735-*b* which are overlapping in time, respectively, with the second UCI repetition 730-*b* and the third UCI repetition 730-*c*. Thus, in this example, the first UCI repetition 730-*a* may be transmitted using PUCCH resources, the second UCI repetition 730-*b* may be multiplexed with the first PUSCH 735-*a*, and the third UCI repetition 730-*c* may be multiplexed with second PUSCH 735-*b* to generate, respectively, first multiplexed PUSCH plus UCI 710-*a* and second multiplexed PUSCH plus UCI 740-*b*. In such cases, techniques such as discussed herein may be used to provide that the UCI 730 repetitions may be combined and decoded using soft-combining. Techniques as discussed above may be applied to such cases. Further, while the various examples discussed herein show an initial repetition that may be transmitted using PUCCH, in some cases such an initial repetition may be multiplexed with PUSCH and one or more subsequent repetitions may be transmitted using PUCCH. Again, techniques as described herein may be applied to such cases to provide UCI repetitions that can be soft-combined at a receiver.

Figure 8:
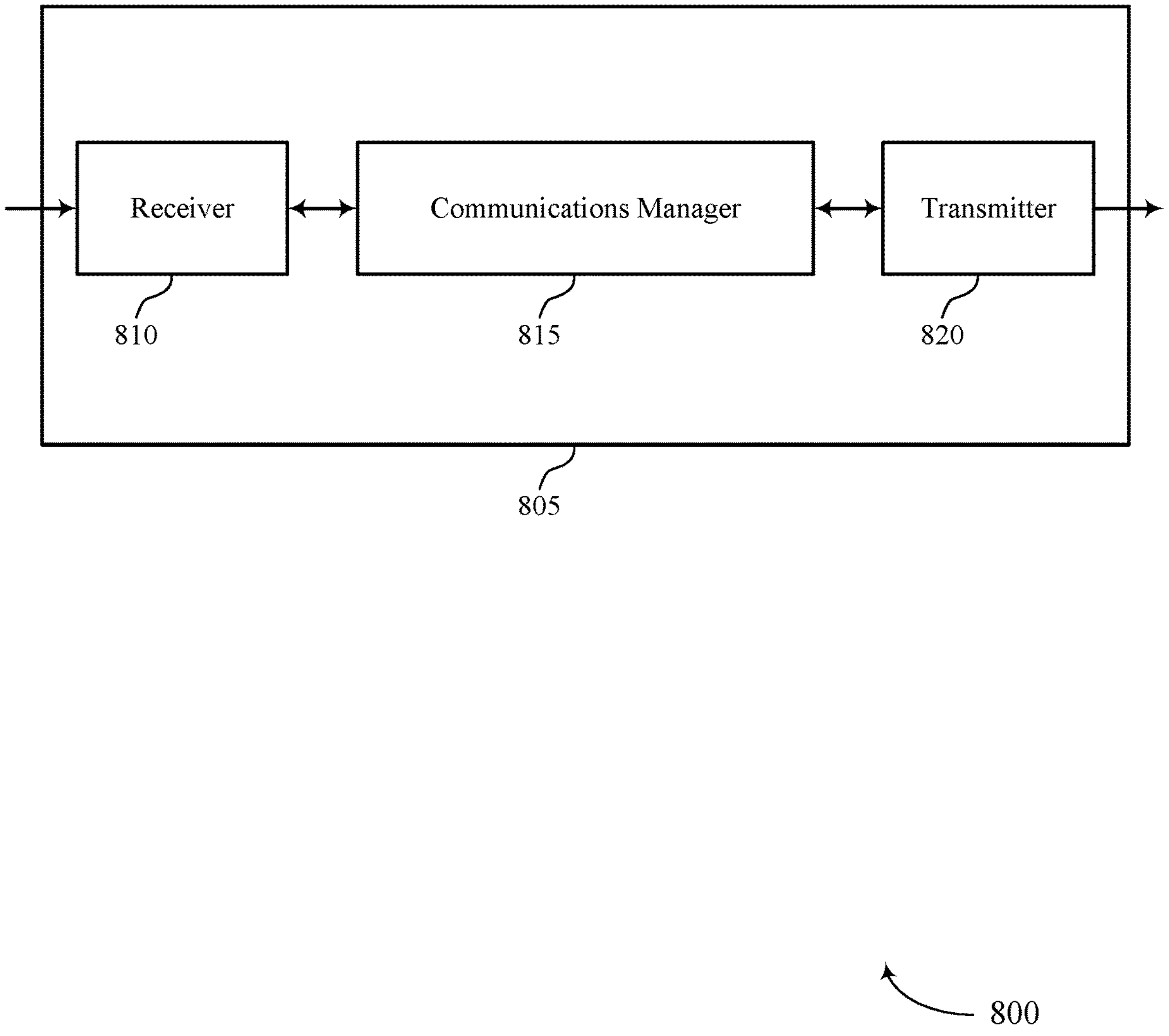
FIGS. 8 and 9 show block diagrams of devices that support uplink control information repetition multiplexing with uplink shared channel communications in accordance with aspects of the present disclosure.

FIG. 8 shows a block diagram 800 of a device 805 that supports UCI repetition multiplexing with uplink shared channel communications in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to uplink control information repetition multiplexing with uplink shared channel communications, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may determine that a first repetition of a control information communication is to be transmitted in a first uplink communication to a base station, and that a second repetition of the control information communication is to be transmitted in a second uplink communication to the base station, where the first uplink communication and the second uplink communication use one or more of a different modulation and coding scheme or a different number of transmission layers, transmit, to the base station, the first uplink communication with the encoded first repetition and the second uplink communication with the encoded second repetition, determine a number of resource elements for transmitting each of the first repetition and the second repetition of the control information communication such that each of the first repetition and the second repetition have a same number of coded bits for transmission to the base station, and encode, based on the determined number of resource elements, the first repetition of the control information communication and the second repetition of the control information communication to generate an encoded first repetition and an encoded second repetition that each have the same number of coded bits.

The communications manager 815 may also receive, from a base station, configuration information that indicates multiple repetitions of uplink control information communications are to be transmitted to the base station, and that indicates whether a number of coded bits for each uplink control information repetition are to be the same or can be different, determine that a first repetition of an uplink control information communication is to be transmitted in a first uplink communication to the base station, and that a second repetition of the uplink control information communication is to be transmitted in a second uplink communication to the base station, where the first uplink communication and the second uplink communication use one or more of a different modulation and coding scheme or a different number of transmission layers, determine a first number of resource elements for the first repetition independently of a determination of a second number of resource elements for the second repetition responsive to the configuration information indication that the number of coded bits for each uplink control information repetition can be different, determine a same number of coded bits for transmitting each of the first repetition and the second repetition of the uplink control information communication responsive to the configuration information indication that the number of coded bits for each uplink control information repetition are to be the same, and transmit, to the base station, the first repetition and the second repetition using the determined number of coded bits. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
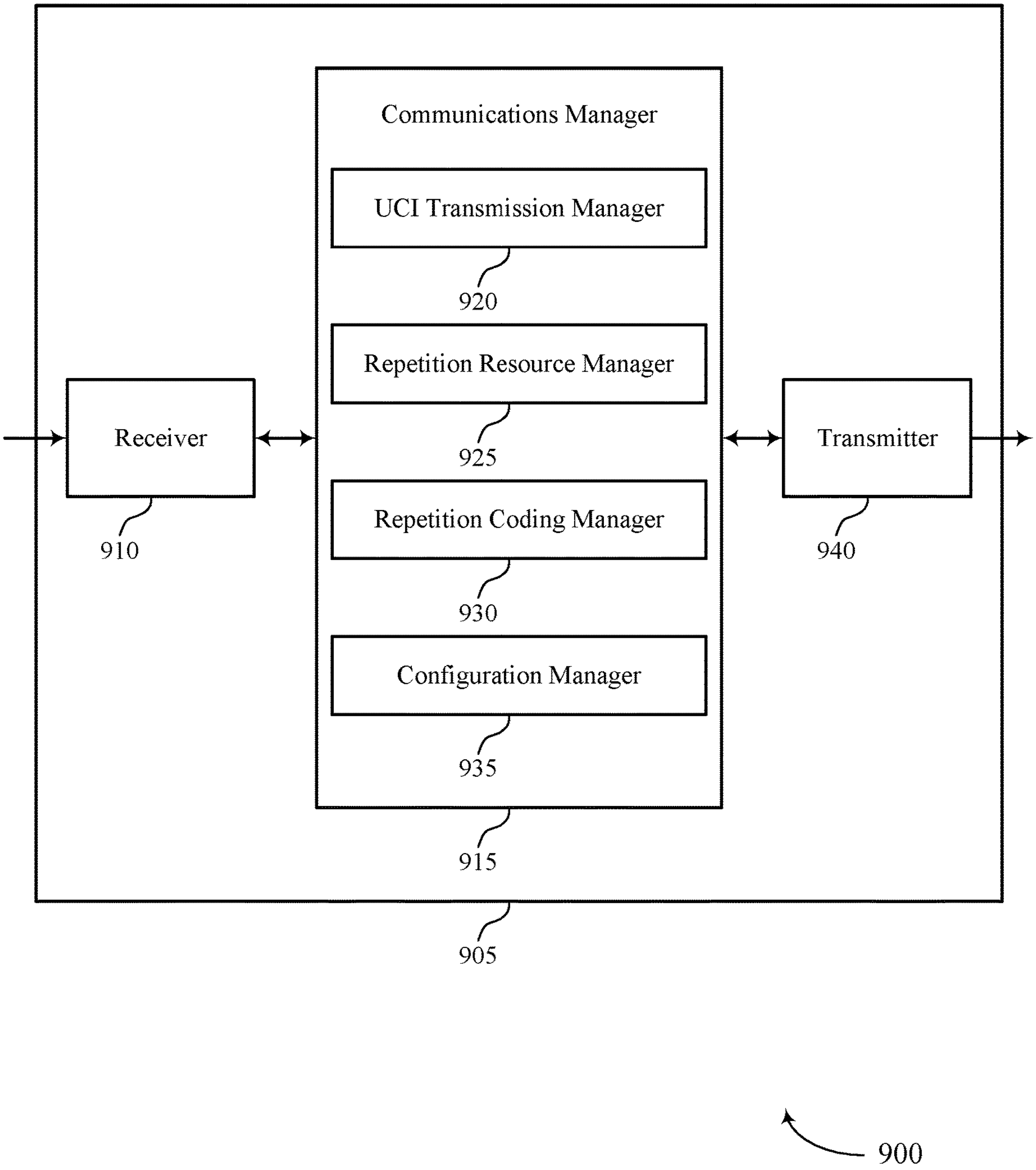

FIG. 9 shows a block diagram 900 of a device 905 that supports UCI repetition multiplexing with uplink shared channel communications in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to uplink control information repetition multiplexing with uplink shared channel communications, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an UCI transmission manager 920, a repetition resource manager 925, a repetition coding manager 930, and a configuration manager 935. The communications manager 915 may be an example of aspects of the communications manager 1110 described herein.

In some cases, the UCI transmission manager 920 may determine that a first repetition of a control information communication is to be transmitted in a first uplink communication to a base station, and that a second repetition of the control information communication is to be transmitted in a second uplink communication to the base station, where the first uplink communication and the second uplink communication use one or more of a different modulation and coding scheme or a different number of transmission layers and transmit, to the base station, the first uplink communication with the encoded first repetition and the second uplink communication with the encoded second repetition. The repetition resource manager 925 may determine a number of resource elements for transmitting each of the first repetition and the second repetition of the control information communication such that each of the first repetition and the second repetition have a same number of coded bits for transmission to the base station. The repetition coding manager 930 may encode, based on the determined number of resource elements, the first repetition of the control information communication and the second repetition of the control information communication to generate an encoded first repetition and an encoded second repetition that each have the same number of coded bits.

In some cases, the configuration manager 935 may receive, from a base station, configuration information that indicates multiple repetitions of uplink control information communications are to be transmitted to the base station, and that indicates whether a number of coded bits for each uplink control information repetition are to be the same or can be different. The repetition resource manager 925 may determine that a first repetition of an uplink control information communication is to be transmitted in a first uplink communication to the base station, and that a second repetition of the uplink control information communication is to be transmitted in a second uplink communication to the base station, where the first uplink communication and the second uplink communication use one or more of a different modulation and coding scheme or a different number of transmission layers and determine a first number of resource elements for the first repetition independently of a determination of a second number of resource elements for the second repetition responsive to the configuration information indication that the number of coded bits for each uplink control information repetition can be different. The repetition coding manager 930 may determine a same number of coded bits for transmitting each of the first repetition and the second repetition of the uplink control information communication responsive to the configuration information indication that the number of coded bits for each uplink control information repetition are to be the same. The UCI transmission manager 920 may transmit, to the base station, the first repetition and the second repetition using the determined number of coded bits.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
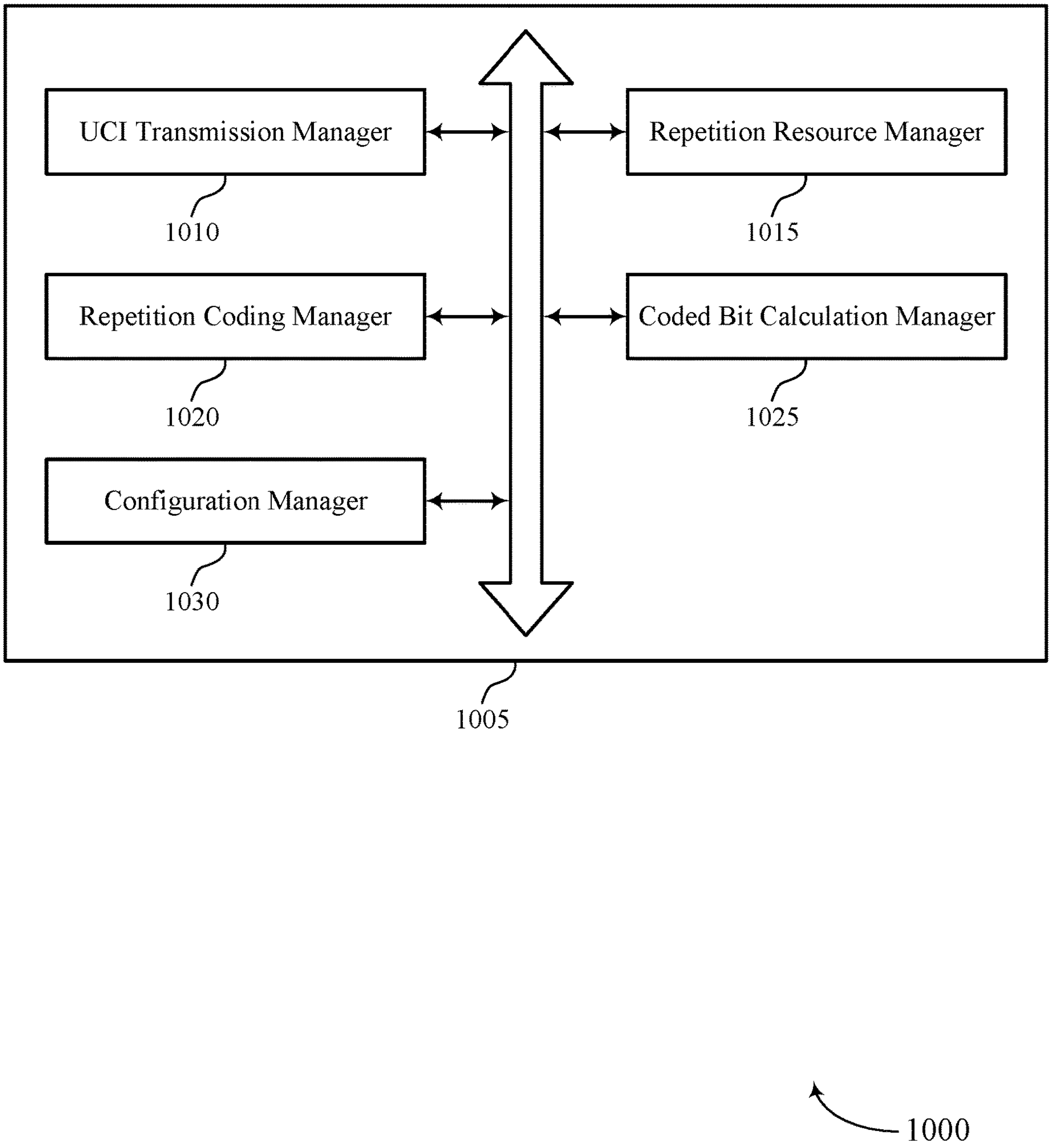
FIG. 10 shows a block diagram of a communications manager that supports uplink control information repetition multiplexing with uplink shared channel communications in accordance with aspects of the present disclosure.

FIG. 10 shows a block diagram 1000 of a communications manager 1005 that supports UCI repetition multiplexing with uplink shared channel communications in accordance with aspects of the present disclosure. The communications manager 1005 may be an example of aspects of a communications manager 815, a communications manager 915, or a communications manager 1110 described herein. The communications manager 1005 may include an UCI transmission manager 1010, a repetition resource manager 1015, a repetition coding manager 1020, a coded bit calculation manager 1025, and a configuration manager 1030. Each of these modules may communicate, directly or indirectly, with one another (e.g., via one or more buses).

The UCI transmission manager 1010 may determine that a first repetition of a control information communication is to be transmitted in a first uplink communication to a base station, and that a second repetition of the control information communication is to be transmitted in a second uplink communication to the base station, where the first uplink communication and the second uplink communication use one or more of a different modulation and coding scheme or a different number of transmission layers. In some examples, the UCI transmission manager 1010 may transmit, to the base station, the first uplink communication with the encoded first repetition and the second uplink communication with the encoded second repetition. In some examples, the UCI transmission manager 1010 may transmit, to the base station, the first repetition and the second repetition using the determined number of coded bits.

The repetition resource manager 1015 may determine a number of resource elements for transmitting each of the first repetition and the second repetition of the control information communication such that each of the first repetition and the second repetition have a same number of coded bits for transmission to the base station. In some examples, the repetition resource manager 1015 may determine that a first repetition of an uplink control information communication is to be transmitted in a first uplink communication to the base station, and that a second repetition of the uplink control information communication is to be transmitted in a second uplink communication to the base station, where the first uplink communication and the second uplink communication use one or more of a different modulation and coding scheme or a different number of transmission layers.

In some examples, the repetition resource manager 1015 may determine a first number of resource elements for the first repetition independently of a determination of a second number of resource elements for the second repetition responsive to the configuration information indication that the number of coded bits for each uplink control information repetition can be different.

In some cases, the first uplink communication uses an uplink control channel resource and the second uplink communication uses a PUSCH resource, and where the first repetition of the control information communication uses transmission parameters that are defined by a format of the uplink control channel and the second repetition of the control information communication uses transmission parameters that are provided for the PUSCH resource. In some cases, the first uplink communication uses a first PUSCH resource and the second uplink communication uses a second PUSCH resource, and where the first repetition of the control information communication uses transmission parameters that are provided for the first PUSCH resource and the second repetition of the control information communication uses transmission parameters that are provided for the second PUSCH resource.

The repetition coding manager 1020 may encode, based on the determined number of resource elements, the first repetition of the control information communication and the second repetition of the control information communication to generate an encoded first repetition and an encoded second repetition that each have the same number of coded bits. In some examples, the repetition coding manager 1020 may determine a same number of coded bits for transmitting each of the first repetition and the second repetition of the uplink control information communication responsive to the configuration information indication that the number of coded bits for each uplink control information repetition are to be the same. In some examples, the repetition coding manager 1020 may select the number of coded bits associated with the first repetition of the control information communication or associated with the second repetition of the control information communication.

In some cases, an encoding sequence and a rate-matching output sequence associated with the first repetition of the control information communication and the second repetition of the control information communication have a same length that allows for soft combining of multiple repetitions of the control information communication. In some cases, the coded bits of the first repetition or the second repetition of the control information communication are padded with zeros when the selected number of coded bits is less than the first number of coded bits or the second number of coded bits. In some cases, a last number of coded bits of the first repetition or the second repetition of the control information communication are dropped when the selected number of coded bits is greater than the first number of coded bits or the second number of coded bits.

In some cases, a first number of coded bits associated with the first repetition is determined based on the transmission parameters that are defined by the format of the uplink control channel, and a second number of coded bits associated with the second repetition is determined based on the transmission parameters that are provided for the PUSCH resource irrespective of the first number of coded bits, responsive to the configuration information indication that the number of coded bits for each uplink control information repetition can be different. In some cases, the determined same number of coded bits is selected from the first number of coded bits or from the second number of coded bits, responsive to the configuration information indication that the number of coded bits for each uplink control information repetition are to be the same.

In some cases, a first number of coded bits associated with the first repetition is determined based on the transmission parameters that are provided for the first PUSCH resource, and a second number of coded bits is determined based on the transmission parameters that are provided for the second PUSCH resource irrespective of the first number of coded bits, responsive to the configuration information indication that the number of coded bits for each uplink control information repetition can be different.

The configuration manager 1030 may receive, from a base station, configuration information that indicates multiple repetitions of uplink control information communications are to be transmitted to the base station, and that indicates whether a number of coded bits for each uplink control information repetition are to be the same or can be different.

The coded bit calculation manager 1025 may calculate a first number of coded bits for the first repetition of the control information communication using the uplink control channel resource. In some examples, the coded bit calculation manager 1025 may calculate a second number of coded bits for the second repetition of the control information communication using the PUSCH resource. In some examples, the coded bit calculation manager 1025 may select the first number of coded bits or the second number of coded bits to be used for both the first repetition and the second repetition of the control information communication.

In some examples, the coded bit calculation manager 1025 may map the first number of coded bits to a first number of resource elements on the uplink control channel resource. In some examples, the coded bit calculation manager 1025 may calculate the second number of coded bits associated with the second number of resource elements based on the first number of coded bits, where the second number of coded bits is equal to the first number of coded bits. In some examples, the coded bit calculation manager 1025 may calculate a second number of coded bits for the second repetition of the control information communication using the PUSCH resource. In some examples, the coded bit calculation manager 1025 may map the second number of coded bits to a second number of resource elements on the PUSCH resource.

In some examples, the coded bit calculation manager 1025 may calculate a first number of coded bits associated with the first repetition based on the second number of coded bits, where the first number of coded bits is equal to the second number of coded bits. In some examples, the coded bit calculation manager 1025 may calculate a first number of coded bits for the first repetition of the control information communication using the first PUSCH resource.

In some examples, the coded bit calculation manager 1025 may calculate a second number of coded bits for the second repetition of the control information communication using the second PUSCH resource. In some examples, the coded bit calculation manager 1025 may calculate the second number of coded bits based on the first number of coded bits, where a second number of coded bits of the second number of resource elements is equal to the first number of coded bits.

In some cases, a minimum or a maximum of the first number of coded bits or the second number of coded bits is selected to be used for both the first repetition and the second repetition of the control information communication based on a configuration of the UE. In some cases, the number of coded bits associated with the uplink control channel resource or the PUSCH resource is selected based on a configuration of the UE. In some cases, the number of coded bits associated with the first PUSCH resource or the second PUSCH resource is selected based on a configuration of the UE.

Figure 11:
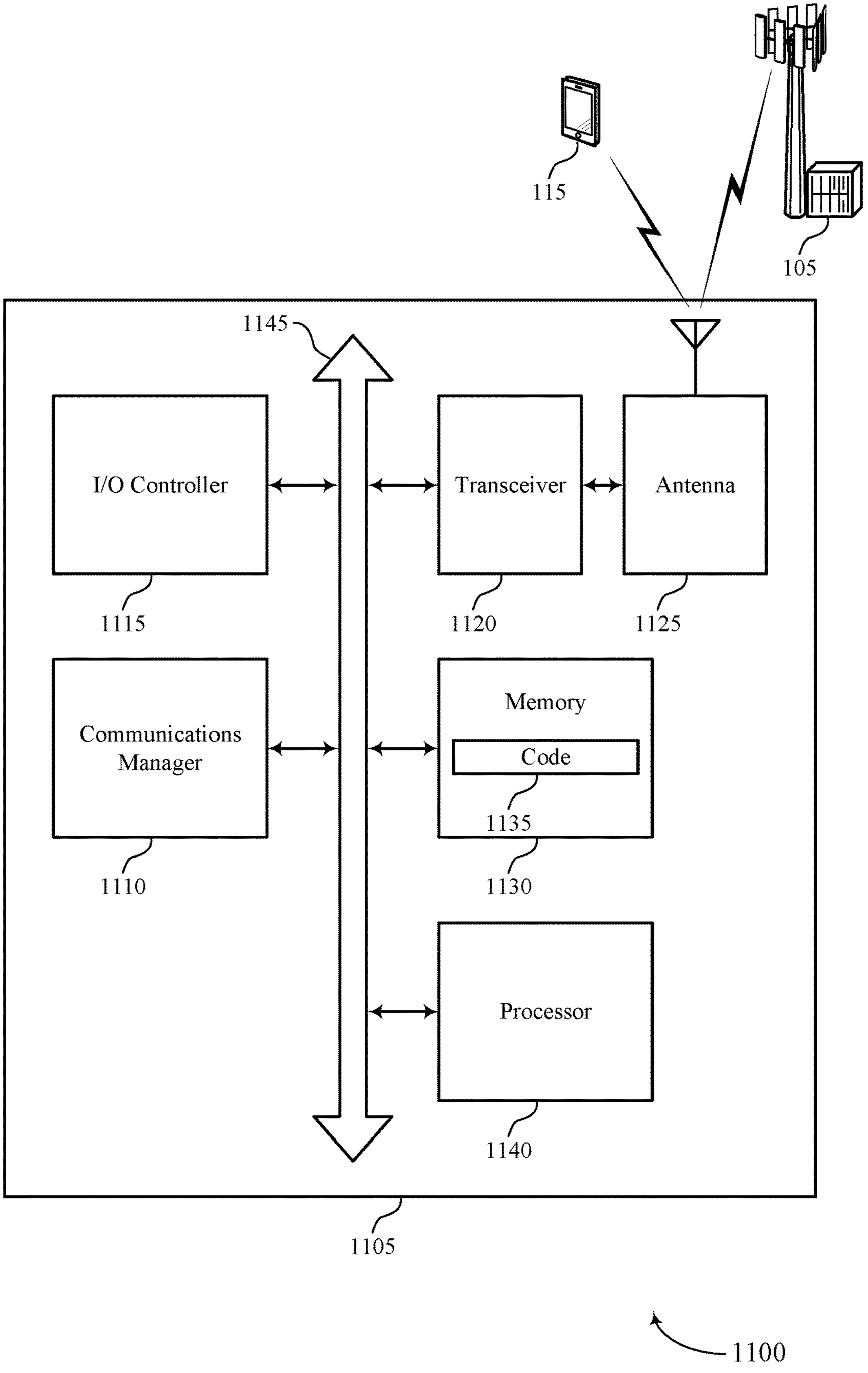
FIG. 11 shows a diagram of a system including a device that supports uplink control information repetition multiplexing with uplink shared channel communications in accordance with aspects of the present disclosure.

FIG. 11 shows a diagram of a system 1100 including a device 1105 that supports UCI repetition multiplexing with uplink shared channel communications in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may determine that a first repetition of a control information communication is to be transmitted in a first uplink communication to a base station, and that a second repetition of the control information communication is to be transmitted in a second uplink communication to the base station, where the first uplink communication and the second uplink communication use one or more of a different modulation and coding scheme or a different number of transmission layers, transmit, to the base station, the first uplink communication with the encoded first repetition and the second uplink communication with the encoded second repetition, determine a number of resource elements for transmitting each of the first repetition and the second repetition of the control information communication such that each of the first repetition and the second repetition have a same number of coded bits for transmission to the base station, and encode, based on the determined number of resource elements, the first repetition of the control information communication and the second repetition of the control information communication to generate an encoded first repetition and an encoded second repetition that each have the same number of coded bits.

The communications manager 1110 may also receive, from a base station, configuration information that indicates multiple repetitions of uplink control information communications are to be transmitted to the base station, and that indicates whether a number of coded bits for each uplink control information repetition are to be the same or can be different, determine that a first repetition of an uplink control information communication is to be transmitted in a first uplink communication to the base station, and that a second repetition of the uplink control information communication is to be transmitted in a second uplink communication to the base station, where the first uplink communication and the second uplink communication use one or more of a different modulation and coding scheme or a different number of transmission layers, determine a first number of resource elements for the first repetition independently of a determination of a second number of resource elements for the second repetition responsive to the configuration information indication that the number of coded bits for each uplink control information repetition can be different, determine a same number of coded bits for transmitting each of the first repetition and the second repetition of the uplink control information communication responsive to the configuration information indication that the number of coded bits for each uplink control information repetition are to be the same, and transmit, to the base station, the first repetition and the second repetition using the determined number of coded bits.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting uplink control information repetition multiplexing with uplink shared channel communications).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
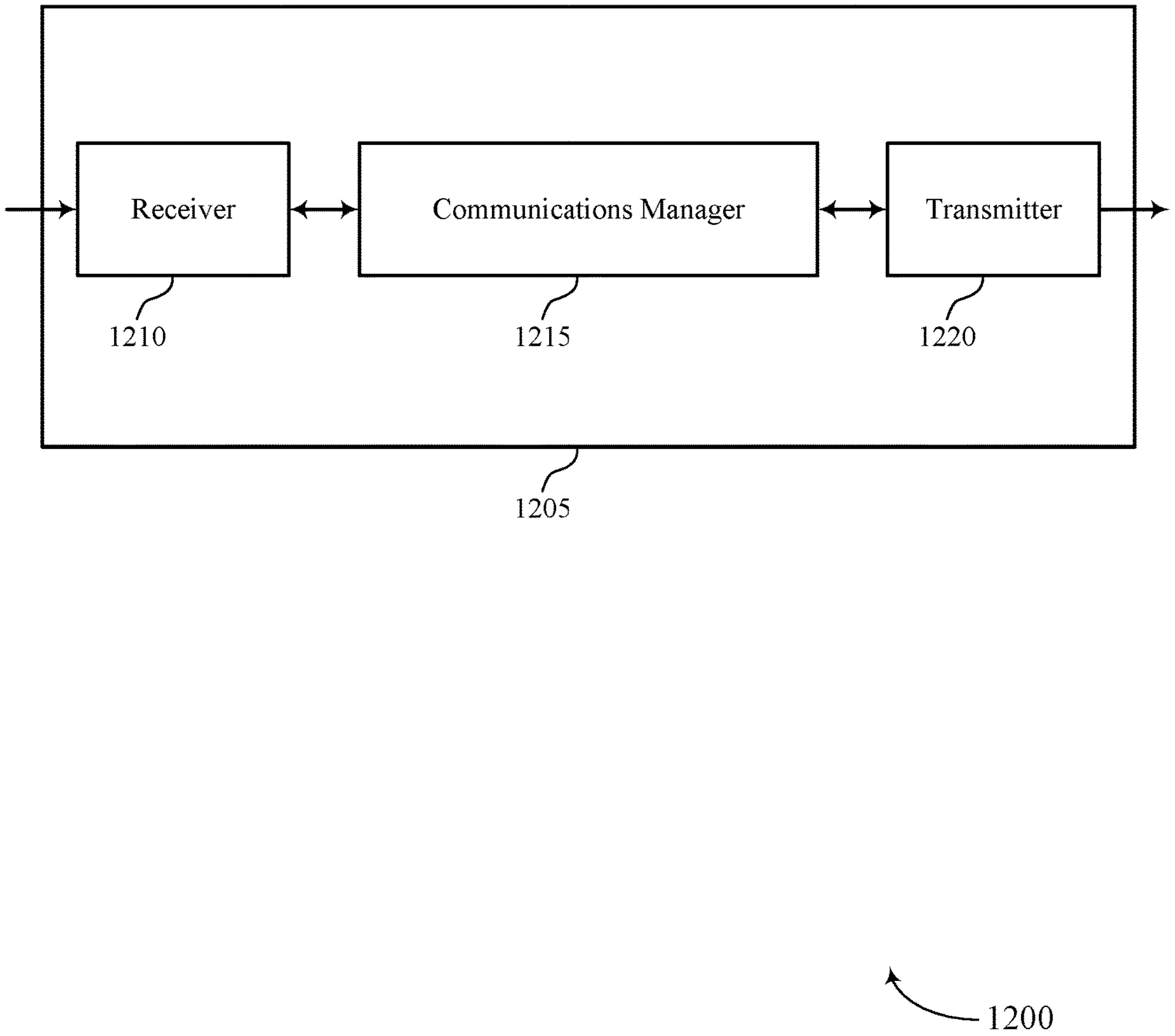
FIGS. 12 and 13 show block diagrams of devices that support uplink control information repetition multiplexing with uplink shared channel communications in accordance with aspects of the present disclosure.

FIG. 12 shows a block diagram 1200 of a device 1205 that supports UCI repetition multiplexing with uplink shared channel communications in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to uplink control information repetition multiplexing with uplink shared channel communications, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may determine that a first repetition of a control information communication from a UE is to be received in a first uplink communication, and that a second repetition of the control information communication is to be received in a second uplink communication from the UE, where the first uplink communication and the second uplink communication use one or more of a different modulation and coding scheme or a different number of transmission layers, determine a number of resource elements for each of the first repetition and the second repetition of the control information communication such that each of the first repetition and the second repetition have a same number of coded bits, buffer received signals from the determined number of resource elements of the first repetition in a soft combining buffer, add received signals from the determined number of resource elements of the second repetition to the soft combining buffer, and decode the buffered signals in the soft combining buffer to determine the control information communication.

The communications manager 1215 may also transmit, to a UE, configuration information that indicates multiple repetitions of uplink control information communications are to be transmitted from the UE to the base station, and that indicates whether a number of coded bits for each uplink control information repetition are to be the same or can be different, determine that a first repetition of an uplink control information communication is to be transmitted in a first uplink communication from the UE, and that a second repetition of the uplink control information communication is to be transmitted in a second uplink communication from the UE, where the first uplink communication and the second uplink communication use one or more of a different modulation and coding scheme or a different number of transmission layers, determine a first number of resource elements for the first repetition independently of a determination of a second number of resource elements for the second repetition responsive to the configuration information indication that the number of resource elements for each uplink control information repetition can be different, determine a same number of coded bits for each of the first repetition and the second repetition of the uplink control information communication responsive to the configuration information indication that the number of coded bits for each uplink control information repetition are to be the same, buffer received signals of the first repetition in a soft combining buffer, add received signals of the second repetition to the soft combining buffer when the first repetition and the second repetition have the determined same number of coded bits or when a difference between the first number of coded bits and the second number of coded bits is below a threshold value, and decode the buffered signals in the soft combining buffer to determine the control information communication. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
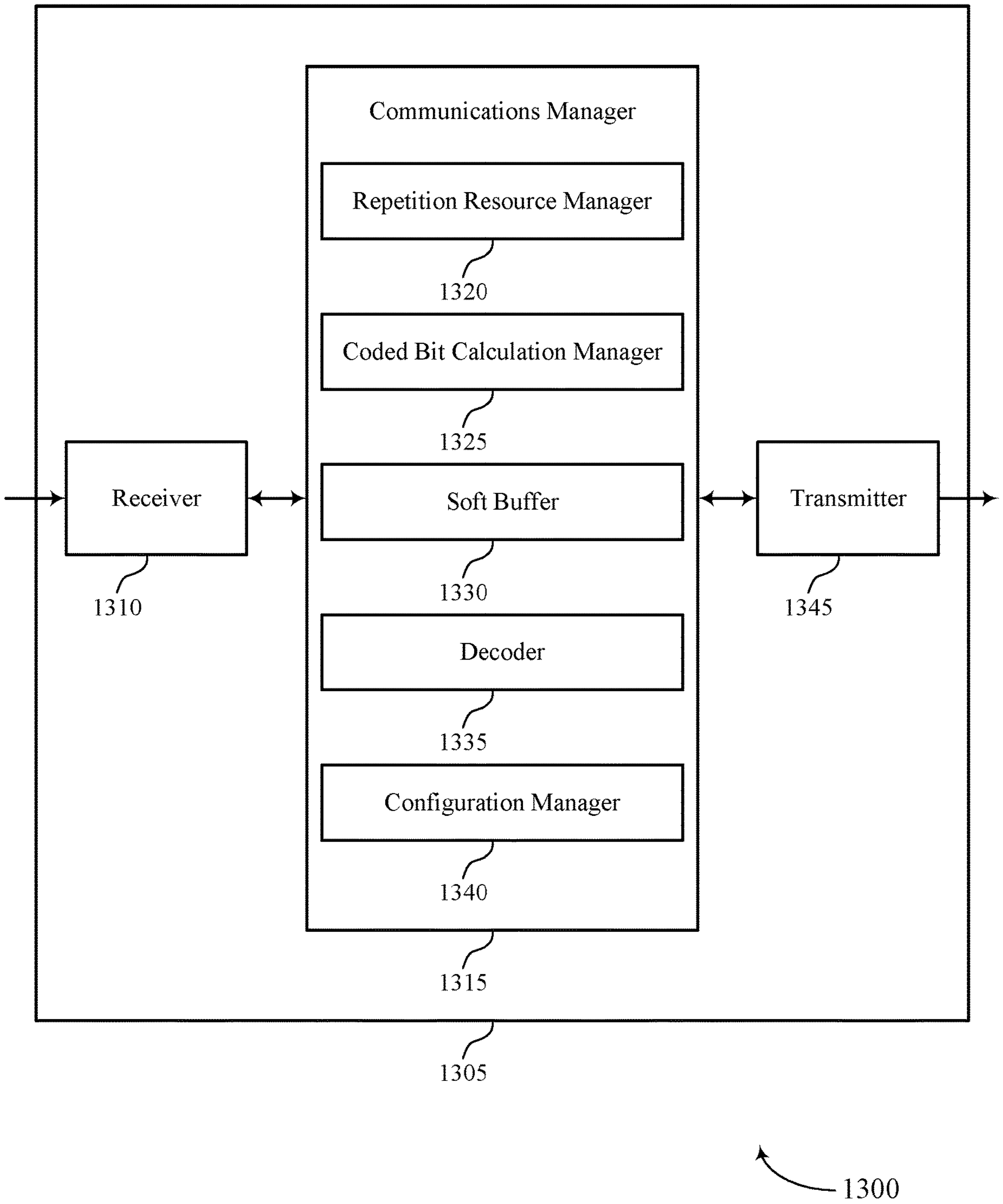

FIG. 13 shows a block diagram 1300 of a device 1305 that supports UCI repetition multiplexing with uplink shared channel communications in accordance with aspects of the present disclosure. The device 1305 may be an example of aspects of a device 1205, or a base station 105 as described herein. The device 1305 may include a receiver 1310, a communications manager 1315, and a transmitter 1345. The device 1305 may also include a processor. Each of these components may be in communication with one another (e.g., via one or more buses).

The receiver 1310 may receive information such as packets, user data, or control information associated with various information channels (e.g., control channels, data channels, and information related to uplink control information repetition multiplexing with uplink shared channel communications, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a repetition resource manager 1320, a coded bit calculation manager 1325, a soft buffer 1330, a decoder 1335, and a configuration manager 1340. The communications manager 1315 may be an example of aspects of the communications manager 1510 described herein.

In some cases, the repetition resource manager 1320 may determine that a first repetition of a control information communication from a UE is to be received in a first uplink communication, and that a second repetition of the control information communication is to be received in a second uplink communication from the UE, where the first uplink communication and the second uplink communication use one or more of a different modulation and coding scheme or a different number of transmission layers. The coded bit calculation manager 1325 may determine a number of resource elements for each of the first repetition and the second repetition of the control information communication such that each of the first repetition and the second repetition have a same number of coded bits. The soft buffer 1330 may buffer received signals from the determined number of resource elements of the first repetition in a soft combining buffer and add received signals from the determined number of resource elements of the second repetition to the soft combining buffer. The decoder 1335 may decode the buffered signals in the soft combining buffer to determine the control information communication.

In some cases, the configuration manager 1340 may transmit, to a UE, configuration information that indicates multiple repetitions of uplink control information communications are to be transmitted from the UE to the base station, and that indicates whether a number of coded bits for each uplink control information repetition are to be the same or can be different. The repetition resource manager 1320 may determine that a first repetition of an uplink control information communication is to be transmitted in a first uplink communication from the UE, and that a second repetition of the uplink control information communication is to be transmitted in a second uplink communication from the UE, where the first uplink communication and the second uplink communication use one or more of a different modulation and coding scheme or a different number of transmission layers and determine a first number of resource elements for the first repetition independently of a determination of a second number of resource elements for the second repetition responsive to the configuration information indication that the number of resource elements for each uplink control information repetition can be different. The coded bit calculation manager 1325 may determine a same number of coded bits for each of the first repetition and the second repetition of the uplink control information communication responsive to the configuration information indication that the number of coded bits for each uplink control information repetition are to be the same. The soft buffer 1330 may buffer received signals of the first repetition in a soft combining buffer and add received signals of the second repetition to the soft combining buffer when the first repetition and the second repetition have the determined same number of coded bits or when a difference between the first number of coded bits and the second number of coded bits is below a threshold value. The decoder 1335 may decode the buffered signals in the soft combining buffer to determine the control information communication.

The transmitter 1345 may transmit signals generated by other components of the device 1305. In some examples, the transmitter 1345 may be collocated with a receiver 1310 in a transceiver module. For example, the transmitter 1345 may be an example of aspects of the transceiver 1520 described with reference to FIG. 15. The transmitter 1345 may utilize a single antenna or a set of antennas.

Figure 14:
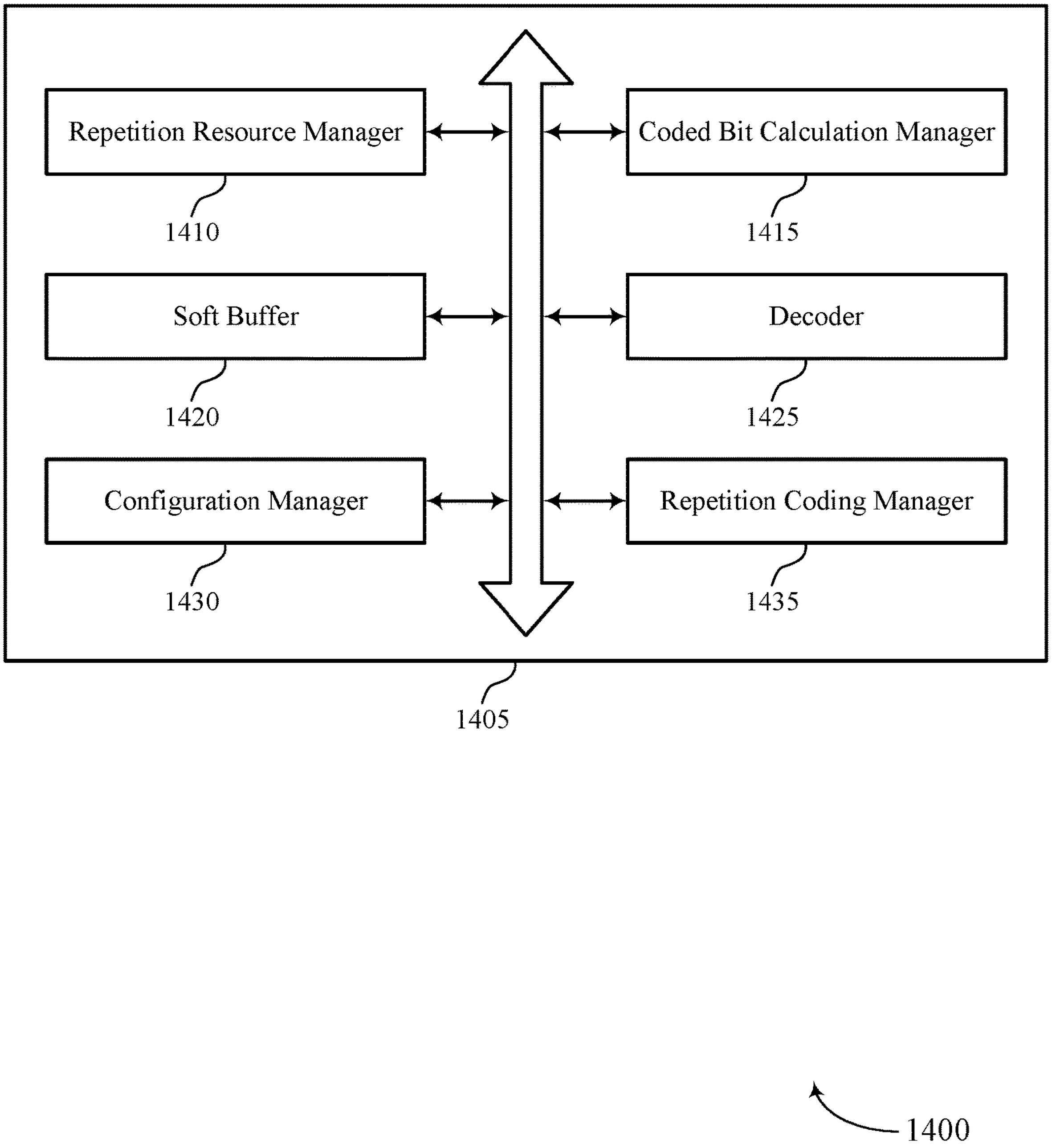
FIG. 14 shows a block diagram of a communications manager that supports uplink control information repetition multiplexing with uplink shared channel communications in accordance with aspects of the present disclosure.

FIG. 14 shows a block diagram 1400 of a communications manager 1405 that supports UCI repetition multiplexing with uplink shared channel communications in accordance with aspects of the present disclosure. The communications manager 1405 may be an example of aspects of a communications manager 1215, a communications manager 1315, or a communications manager 1510 described herein. The communications manager 1405 may include a repetition resource manager 1410, a coded bit calculation manager 1415, a soft buffer 1420, a decoder 1425, a configuration manager 1430, and a repetition coding manager 1435. Each of these modules may communicate, directly or indirectly, with one another (e.g., via one or more buses).

The repetition resource manager 1410 may determine that a first repetition of a control information communication from a UE is to be received in a first uplink communication, and that a second repetition of the control information communication is to be received in a second uplink communication from the UE, where the first uplink communication and the second uplink communication use one or more of a different modulation and coding scheme or a different number of transmission layers.

In some examples, the repetition resource manager 1410 may determine that a first repetition of an uplink control information communication is to be transmitted in a first uplink communication from the UE, and that a second repetition of the uplink control information communication is to be transmitted in a second uplink communication from the UE, where the first uplink communication and the second uplink communication use one or more of a different modulation and coding scheme or a different number of transmission layers.

In some examples, the repetition resource manager 1410 may determine a first number of resource elements for the first repetition independently of a determination of a second number of resource elements for the second repetition responsive to the configuration information indication that the number of resource elements for each uplink control information repetition can be different.

In some examples, the repetition resource manager 1410 may determine a second number of resource elements associated with the PUSCH resource associated with the second repetition of the control information communication, and where a first number of coded bits associated with the first repetition of the control information communication using the uplink control channel resource is determined based on the second number of resource elements.

In some cases, the first uplink communication uses an uplink control channel resource and the second uplink communication uses a PUSCH resource, and where the first repetition of the control information communication uses transmission parameters that are defined by a format of the uplink control channel and the second repetition of the control information communication uses transmission parameters that are provided for the PUSCH resource.

In some cases, the first uplink communication uses a first PUSCH resource and the second uplink communication uses a second PUSCH resource, and where the first repetition of the control information communication uses transmission parameters that are provided for the first PUSCH resource and the second repetition of the control information communication uses transmission parameters that are provided for the second PUSCH resource.

The coded bit calculation manager 1415 may determine a number of resource elements for each of the first repetition and the second repetition of the control information communication such that each of the first repetition and the second repetition have a same number of coded bits. In some examples, the coded bit calculation manager 1415 may determine a same number of coded bits for each of the first repetition and the second repetition of the uplink control information communication responsive to the configuration information indication that the number of coded bits for each uplink control information repetition are to be the same. In some examples, the coded bit calculation manager 1415 may determine a first number of coded bits associated with the uplink control channel resource associated with the first repetition of the control information communication, and where a second number of resource elements associated with the second repetition of the control information communication using the PUSCH resource is determined based on the first number of coded bits.

In some examples, the coded bit calculation manager 1415 may determine a first number of coded bits associated with the first PUSCH resource associated with the first repetition of the control information communication, and where a second number of coded bits associated with the second repetition of the control information communication using the second PUSCH resource is determined based on the first number of coded bits.

In some cases, the determined number of code bits is selected from a first number of coded bits associated with the first repetition of the control information communication or from a second number of coded bits associated with the second repetition of the control information communication. In some cases, a minimum or a maximum of the first number of coded bits or the second number of coded bits is selected to be used for both the first repetition and the second repetition of the control information communication based on a configuration provided to the UE. In some cases, a number of coded bits associated with the uplink control channel resource or the PUSCH resource is selected based on a configuration provided to the UE. In some cases, the determined number of coded bits is selected from a first number of coded bits associated with the first PUSCH resource or from a second number of coded bits associated with the second PUSCH resource.

The soft buffer 1420 may buffer received signals from the determined number of resource elements of the first repetition in a soft combining buffer. In some examples, the soft buffer 1420 may add received signals from the determined number of resource elements of the second repetition to the soft combining buffer. In some examples, the first repetition and the second repetition have the determined same number of coded bits or a difference between the first number of coded bits and the second number of coded bits is below a threshold value. The decoder 1425 may decode the buffered signals in the soft combining buffer to determine the control information communication.

The configuration manager 1430 may transmit, to a UE, configuration information that indicates multiple repetitions of uplink control information communications are to be transmitted from the UE to the base station, and that indicates whether a number of coded bits for each uplink control information repetition are to be the same or can be different.

The repetition coding manager 1435 may determine a number of coded bits for repetitions of control information.

In some cases, the first number of coded bits is determined based on the transmission parameters that are defined by the format of the uplink control channel, and the second number of coded bits is determined based on the transmission parameters that are provided for the PUSCH resource irrespective of the first number of coded bits, responsive to the configuration information indication that the number of coded bits for each uplink control information repetition can be different. In some cases, the determined number of coded bits is selected from the first number of coded bits or from the second number of coded bits, responsive to the configuration information indication that the number of coded bits for each uplink control information repetition are to be the same.

In some cases, the first number of coded bits is determined based on the transmission parameters that are provided for the first PUSCH resource, and the second number of coded bits is determined based on the transmission parameters that are provided for the second PUSCH resource irrespective of the first number of coded bits, responsive to the configuration information indication that the number of coded bits for each uplink control information repetition can be different. In some cases, the determined number of coded bits is selected from the first number of coded bits or from the second number of coded bits responsive to the configuration information indication that the number of coded bits for each uplink control information repetition are to be the same.

Figure 15:
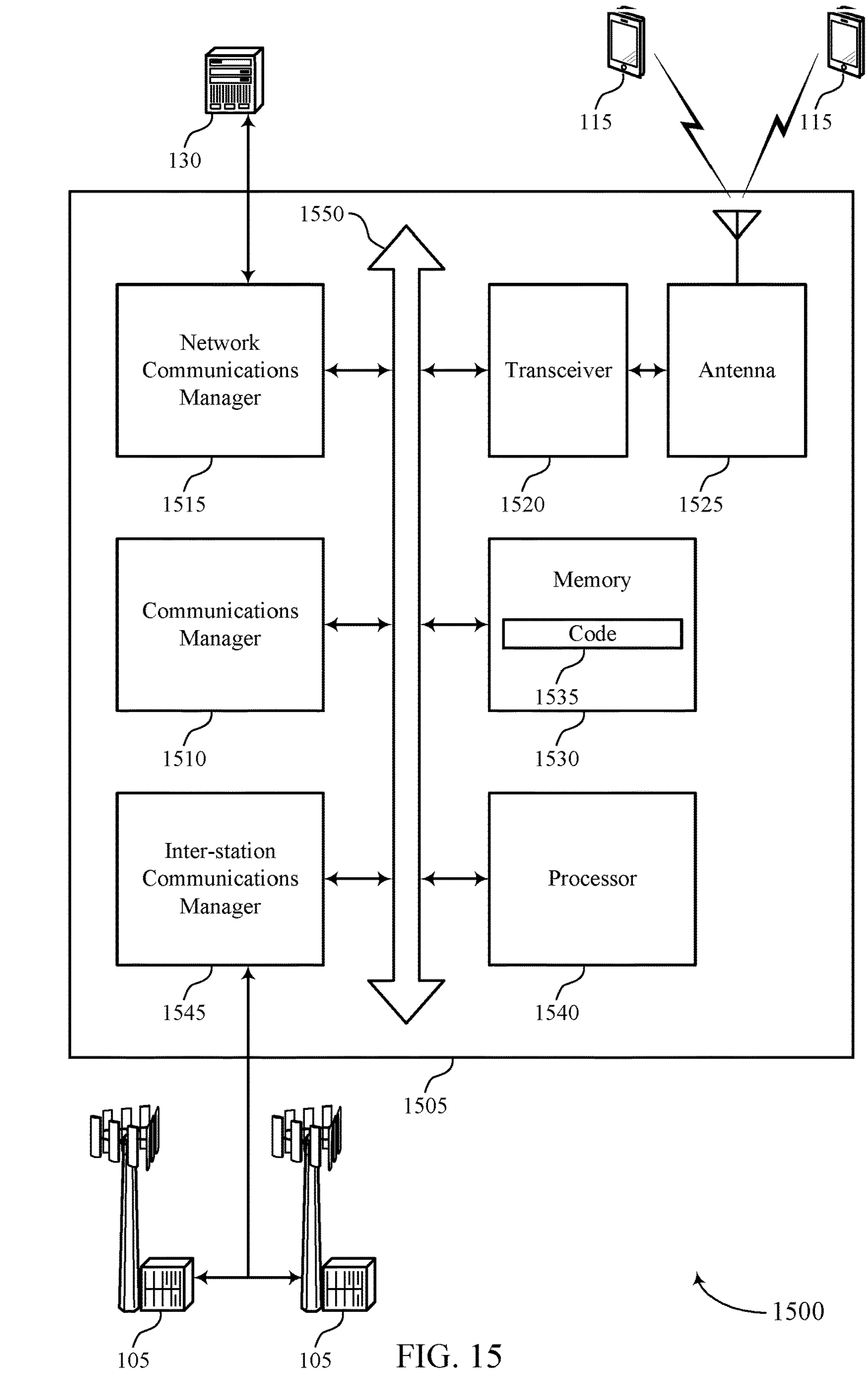
FIG. 15 shows a diagram of a system including a device that supports uplink control information repetition multiplexing with uplink shared channel communications in accordance with aspects of the present disclosure.

FIG. 15 shows a diagram of a system 1500 including a device 1505 that supports UCI repetition multiplexing with uplink shared channel communications in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may determine that a first repetition of a control information communication from a UE is to be received in a first uplink communication, and that a second repetition of the control information communication is to be received in a second uplink communication from the UE, where the first uplink communication and the second uplink communication use one or more of a different modulation and coding scheme or a different number of transmission layers, determine a number of resource elements for each of the first repetition and the second repetition of the control information communication such that each of the first repetition and the second repetition have a same number of coded bits, buffer received signals from the determined number of resource elements of the first repetition in a soft combining buffer, add received signals from the determined number of resource elements of the second repetition to the soft combining buffer, and decode the buffered signals in the soft combining buffer to determine the control information communication.

The communications manager 1510 may also transmit, to a UE, configuration information that indicates multiple repetitions of uplink control information communications are to be transmitted from the UE to the base station, and that indicates whether a number of coded bits for each uplink control information repetition are to be the same or can be different, determine that a first repetition of an uplink control information communication is to be transmitted in a first uplink communication from the UE, and that a second repetition of the uplink control information communication is to be transmitted in a second uplink communication from the UE, where the first uplink communication and the second uplink communication use one or more of a different modulation and coding scheme or a different number of transmission layers, determine a first number of resource elements for the first repetition independently of a determination of a second number of resource elements for the second repetition responsive to the configuration information indication that the number of resource elements for each uplink control information repetition can be different, determine a same number of coded bits for each of the first repetition and the second repetition of the uplink control information communication responsive to the configuration information indication that the number of coded bits for each uplink control information repetition are to be the same, buffer received signals of the first repetition in a soft combining buffer, add received signals of the second repetition to the soft combining buffer when the first repetition and the second repetition have the determined same number of coded bits or when a difference between the first number of coded bits and the second number of coded bits is below a threshold value, and decode the buffered signals in the soft combining buffer to determine the control information communication.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting uplink control information repetition multiplexing with uplink shared channel communications).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
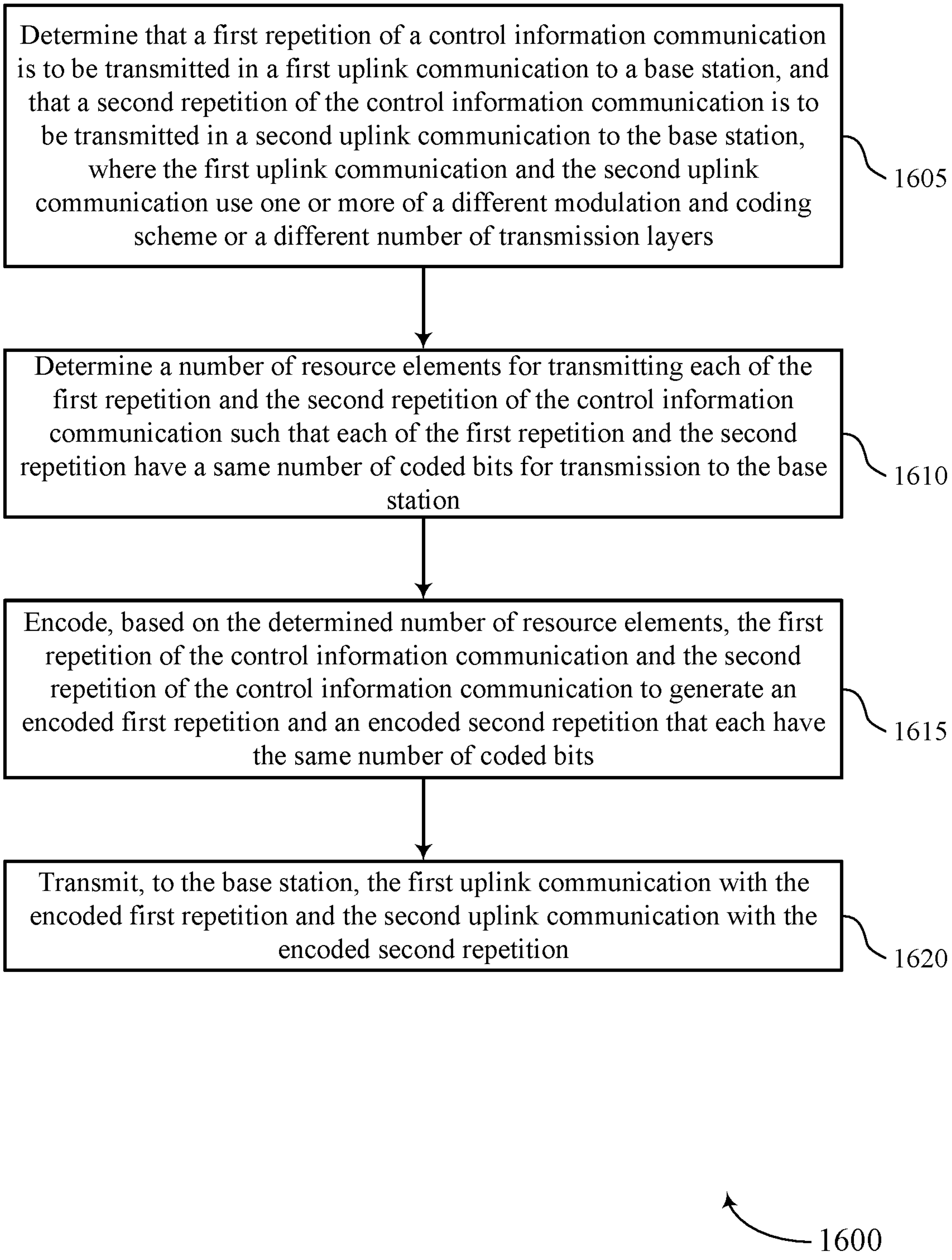
FIGS. 16 through 21 show flowcharts illustrating methods that support uplink control information repetition multiplexing with uplink shared channel communications in accordance with aspects of the present disclosure.

FIG. 16 shows a flowchart illustrating a method 1600 that supports UCI repetition multiplexing with uplink shared channel communications in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may determine that a first repetition of a control information communication is to be transmitted in a first uplink communication to a base station, and that a second repetition of the control information communication is to be transmitted in a second uplink communication to the base station, where the first uplink communication and the second uplink communication use one or more of a different modulation and coding scheme or a different number of transmission layers. The operations of 1605 may be performed according to the methods described herein. In some examples, aspects of the operations of 1605 may be performed by an UCI transmission manager as described with reference to FIGS. 8 through 11.

At 1610, the UE may determine a number of resource elements for transmitting each of the first repetition and the second repetition of the control information communication such that each of the first repetition and the second repetition have a same number of coded bits for transmission to the base station. The operations of 1610 may be performed according to the methods described herein. In some examples, aspects of the operations of 1610 may be performed by a repetition resource manager as described with reference to FIGS. 8 through 11.

At 1615, the UE may encode, based on the determined number of resource elements, the first repetition of the control information communication and the second repetition of the control information communication to generate an encoded first repetition and an encoded second repetition that each have the same number of coded bits. The operations of 1615 may be performed according to the methods described herein. In some examples, aspects of the operations of 1615 may be performed by a repetition coding manager as described with reference to FIGS. 8 through 11.

At 1620, the UE may transmit, to the base station, the first uplink communication with the encoded first repetition and the second uplink communication with the encoded second repetition. The operations of 1620 may be performed according to the methods described herein. In some examples, aspects of the operations of 1620 may be performed by an UCI transmission manager as described with reference to FIGS. 8 through 11.

Figure 17:
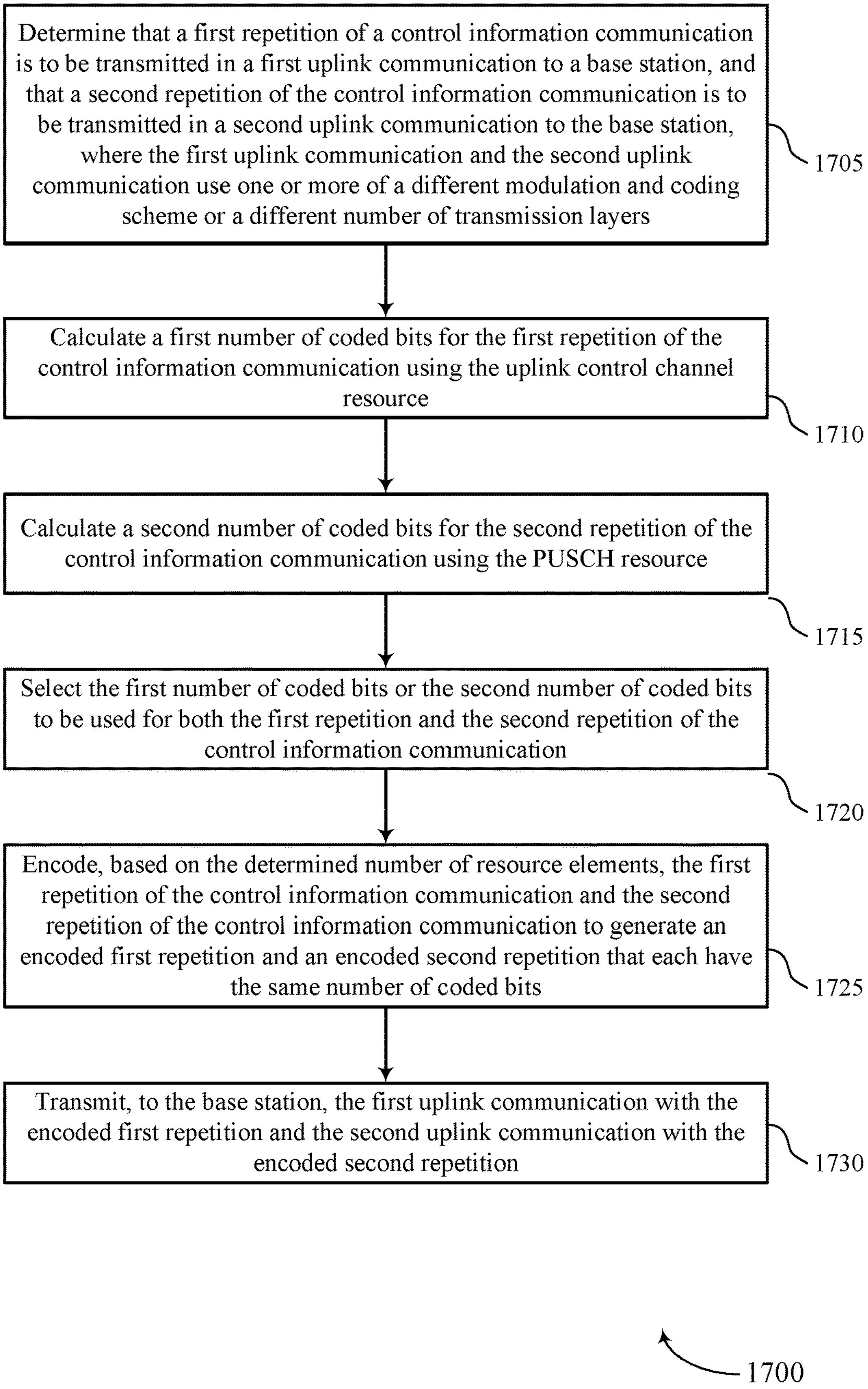

FIG. 17 shows a flowchart illustrating a method 1700 that supports UCI repetition multiplexing with uplink shared channel communications in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may determine that a first repetition of a control information communication is to be transmitted in a first uplink communication to a base station, and that a second repetition of the control information communication is to be transmitted in a second uplink communication to the base station, where the first uplink communication and the second uplink communication use one or more of a different modulation and coding scheme or a different number of transmission layers. The operations of 1705 may be performed according to the methods described herein. In some examples, aspects of the operations of 1705 may be performed by an UCI transmission manager as described with reference to FIGS. 8 through 11. The first uplink communication may use an uplink control channel resource and the second uplink communication may use a PUSCH resource, and where the first repetition of the control information communication uses transmission parameters that are defined by a format of the uplink control channel and the second repetition of the control information communication uses transmission parameters that are provided for the PUSCH resource.

At 1710, the UE may calculate a first number of coded bits for the first repetition of the control information communication using the uplink control channel resource. The operations of 1710 may be performed according to the methods described herein. In some examples, aspects of the operations of 1710 may be performed by a coded bit calculation manager as described with reference to FIGS. 8 through 11.

At 1715, the UE may calculate a second number of coded bits for the second repetition of the control information communication using the PUSCH resource. The operations of 1715 may be performed according to the methods described herein. In some examples, aspects of the operations of 1715 may be performed by a coded bit calculation manager as described with reference to FIGS. 8 through 11.

At 1720, the UE may select the first number of coded bits or the second number of coded bits to be used for both the first repetition and the second repetition of the control information communication. The operations of 1720 may be performed according to the methods described herein. In some examples, aspects of the operations of 1720 may be performed by a coded bit calculation manager as described with reference to FIGS. 8 through 11.

At 1725, the UE may encode, based on the determined number of resource elements, the first repetition of the control information communication and the second repetition of the control information communication to generate an encoded first repetition and an encoded second repetition that each have the same number of coded bits. The operations of 1725 may be performed according to the methods described herein. In some examples, aspects of the operations of 1725 may be performed by a repetition coding manager as described with reference to FIGS. 8 through 11.

At 1730, the UE may transmit, to the base station, the first uplink communication with the encoded first repetition and the second uplink communication with the encoded second repetition. The operations of 1730 may be performed according to the methods described herein. In some examples, aspects of the operations of 1730 may be performed by an UCI transmission manager as described with reference to FIGS. 8 through 11.

Figure 18:
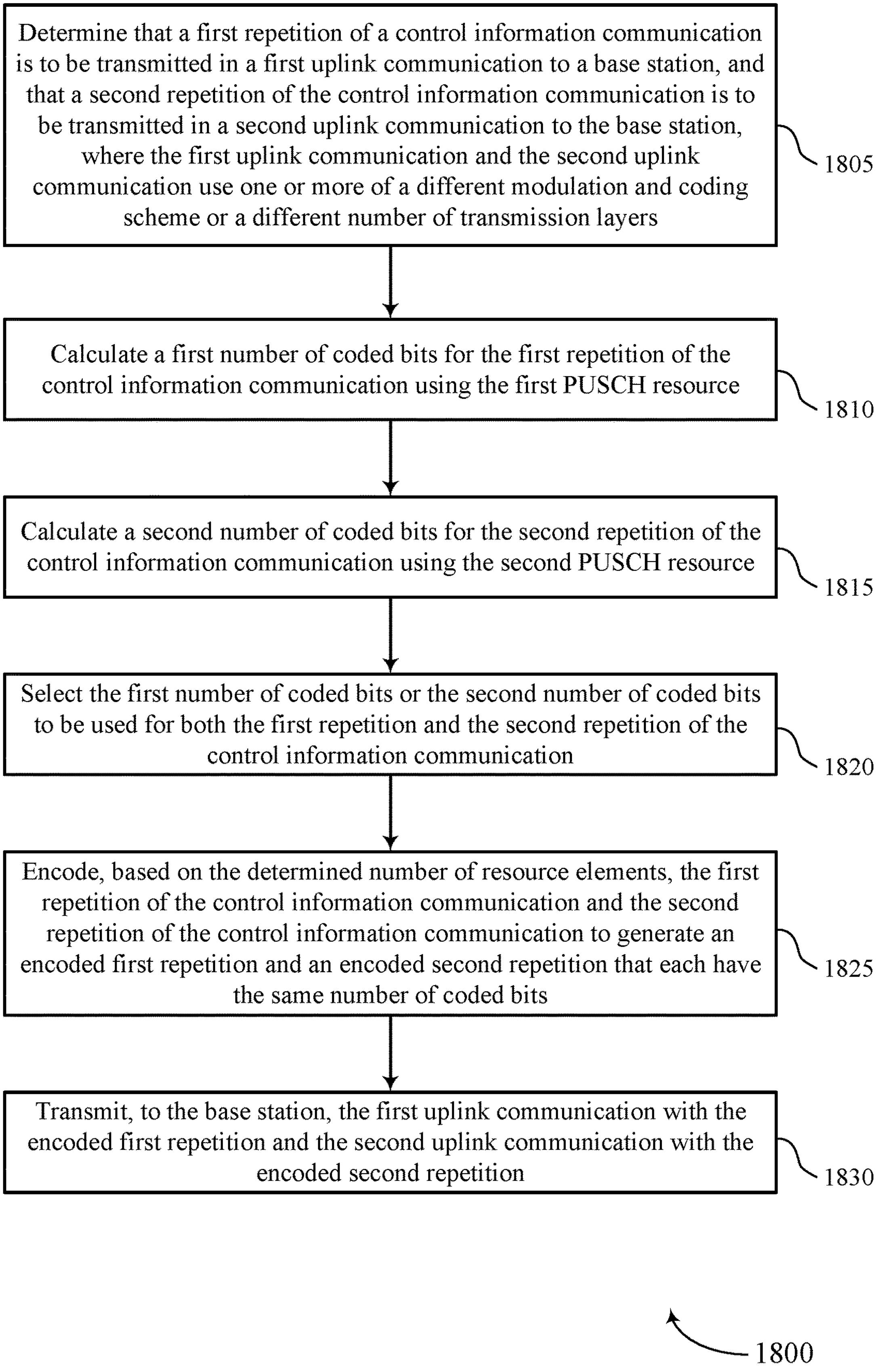

FIG. 18 shows a flowchart illustrating a method 1800 that supports UCI repetition multiplexing with uplink shared channel communications in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may determine that a first repetition of a control information communication is to be transmitted in a first uplink communication to a base station, and that a second repetition of the control information communication is to be transmitted in a second uplink communication to the base station, where the first uplink communication and the second uplink communication use one or more of a different modulation and coding scheme or a different number of transmission layers. The operations of 1805 may be performed according to the methods described herein. In some examples, aspects of the operations of 1805 may be performed by an UCI transmission manager as described with reference to FIGS. 8 through 11. The first uplink communication may use a first PUSCH resource and the second uplink communication may use a second PUSCH resource, and where the first repetition of the control information communication uses transmission parameters that are provided for the first PUSCH resource and the second repetition of the control information communication uses transmission parameters that are provided for the second PUSCH resource.

At 1810, the UE may calculate a first number of coded bits for the first repetition of the control information communication using the first PUSCH resource. The operations of 1810 may be performed according to the methods described herein. In some examples, aspects of the operations of 1810 may be performed by a coded bit calculation manager as described with reference to FIGS. 8 through 11.

At 1815, the UE may calculate a second number of coded bits for the second repetition of the control information communication using the second PUSCH resource. The operations of 1815 may be performed according to the methods described herein. In some examples, aspects of the operations of 1815 may be performed by a coded bit calculation manager as described with reference to FIGS. 8 through 11.

At 1820, the UE may select the first number of coded bits or the second number of coded bits to be used for both the first repetition and the second repetition of the control information communication. The operations of 1820 may be performed according to the methods described herein. In some examples, aspects of the operations of 1820 may be performed by a coded bit calculation manager as described with reference to FIGS. 8 through 11.

At 1825, the UE may encode, based on the determined number of resource elements, the first repetition of the control information communication and the second repetition of the control information communication to generate an encoded first repetition and an encoded second repetition that each have the same number of coded bits. The operations of 1825 may be performed according to the methods described herein. In some examples, aspects of the operations of 1825 may be performed by a repetition coding manager as described with reference to FIGS. 8 through 11.

At 1830, the UE may transmit, to the base station, the first uplink communication with the encoded first repetition and the second uplink communication with the encoded second repetition. The operations of 1830 may be performed according to the methods described herein. In some examples, aspects of the operations of 1830 may be performed by an UCI transmission manager as described with reference to FIGS. 8 through 11.

Figure 19:
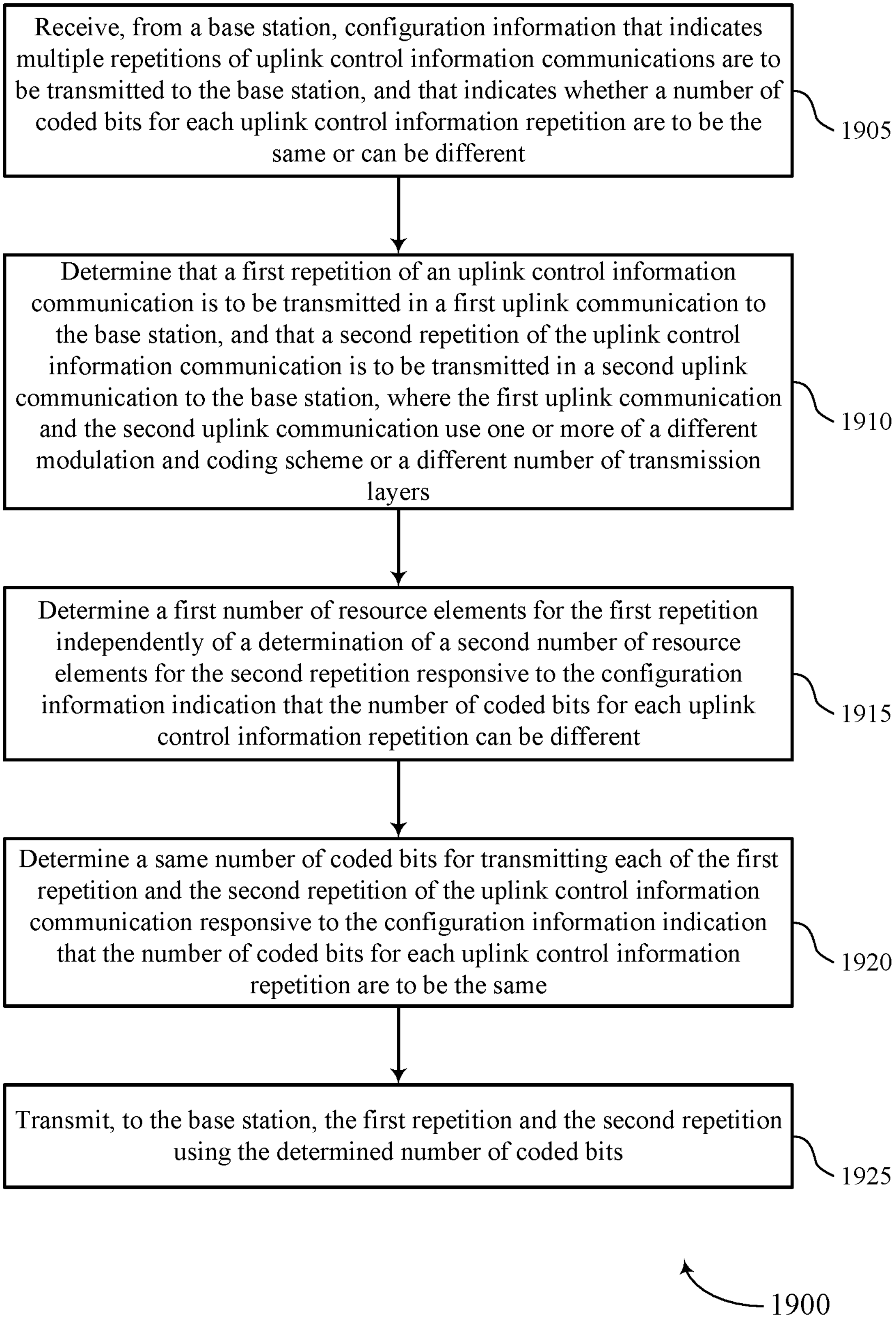

FIG. 19 shows a flowchart illustrating a method 1900 that supports UCI repetition multiplexing with uplink shared channel communications in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, configuration information that indicates multiple repetitions of uplink control information communications are to be transmitted to the base station, and that indicates whether a number of coded bits for each uplink control information repetition are to be the same or can be different. The operations of 1905 may be performed according to the methods described herein. In some examples, aspects of the operations of 1905 may be performed by a configuration manager as described with reference to FIGS. 8 through 11.

At 1910, the UE may determine that a first repetition of an uplink control information communication is to be transmitted in a first uplink communication to the base station, and that a second repetition of the uplink control information communication is to be transmitted in a second uplink communication to the base station, where the first uplink communication and the second uplink communication use one or more of a different modulation and coding scheme or a different number of transmission layers. The operations of 1910 may be performed according to the methods described herein. In some examples, aspects of the operations of 1910 may be performed by a repetition resource manager as described with reference to FIGS. 8 through 11.

At 1915, the UE may determine a first number of resource elements for the first repetition independently of a determination of a second number of resource elements for the second repetition responsive to the configuration information indication that the number of coded bits for each uplink control information repetition can be different. The operations of 1915 may be performed according to the methods described herein. In some examples, aspects of the operations of 1915 may be performed by a repetition resource manager as described with reference to FIGS. 8 through 11.

At 1920, the UE may determine a same number of coded bits for transmitting each of the first repetition and the second repetition of the uplink control information communication responsive to the configuration information indication that the number of coded bits for each uplink control information repetition are to be the same. The operations of 1920 may be performed according to the methods described herein. In some examples, aspects of the operations of 1920 may be performed by a repetition coding manager as described with reference to FIGS. 8 through 11.

At 1925, the UE may transmit, to the base station, the first repetition and the second repetition using the determined number of coded bits. The operations of 1925 may be performed according to the methods described herein. In some examples, aspects of the operations of 1925 may be performed by an UCI transmission manager as described with reference to FIGS. 8 through 11.

Figure 20:
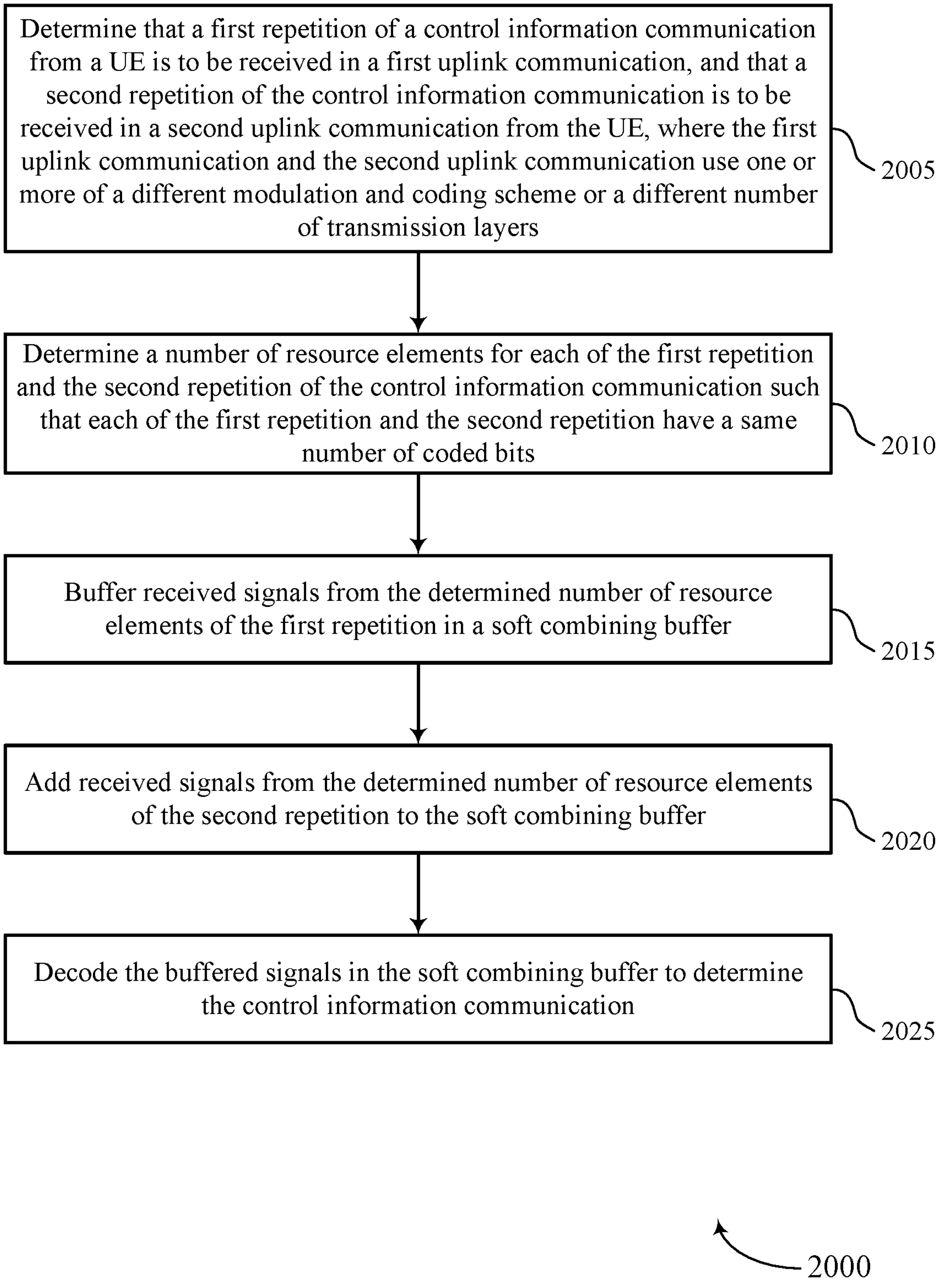

FIG. 20 shows a flowchart illustrating a method 2000 that supports UCI repetition multiplexing with uplink shared channel communications in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may determine that a first repetition of a control information communication from a UE is to be received in a first uplink communication, and that a second repetition of the control information communication is to be received in a second uplink communication from the UE, where the first uplink communication and the second uplink communication use one or more of a different modulation and coding scheme or a different number of transmission layers. The operations of 2005 may be performed according to the methods described herein. In some examples, aspects of the operations of 2005 may be performed by a repetition resource manager as described with reference to FIGS. 12 through 15.

At 2010, the base station may determine a number of resource elements for each of the first repetition and the second repetition of the control information communication such that each of the first repetition and the second repetition have a same number of coded bits. The operations of 2010 may be performed according to the methods described herein. In some examples, aspects of the operations of 2010 may be performed by a coded bit calculation manager as described with reference to FIGS. 12 through 15.

At 2015, the base station may buffer received signals from the determined number of resource elements of the first repetition in a soft combining buffer. The operations of 2015 may be performed according to the methods described herein. In some examples, aspects of the operations of 2015 may be performed by a soft buffer as described with reference to FIGS. 12 through 15.

At 2020, the base station may add received signals from the determined number of resource elements of the second repetition to the soft combining buffer. The operations of 2020 may be performed according to the methods described herein. In some examples, aspects of the operations of 2020 may be performed by a soft buffer as described with reference to FIGS. 12 through 15.

At 2025, the base station may decode the buffered signals in the soft combining buffer to determine the control information communication. The operations of 2025 may be performed according to the methods described herein. In some examples, aspects of the operations of 2025 may be performed by a decoder as described with reference to FIGS. 12 through 15.

Figure 21:
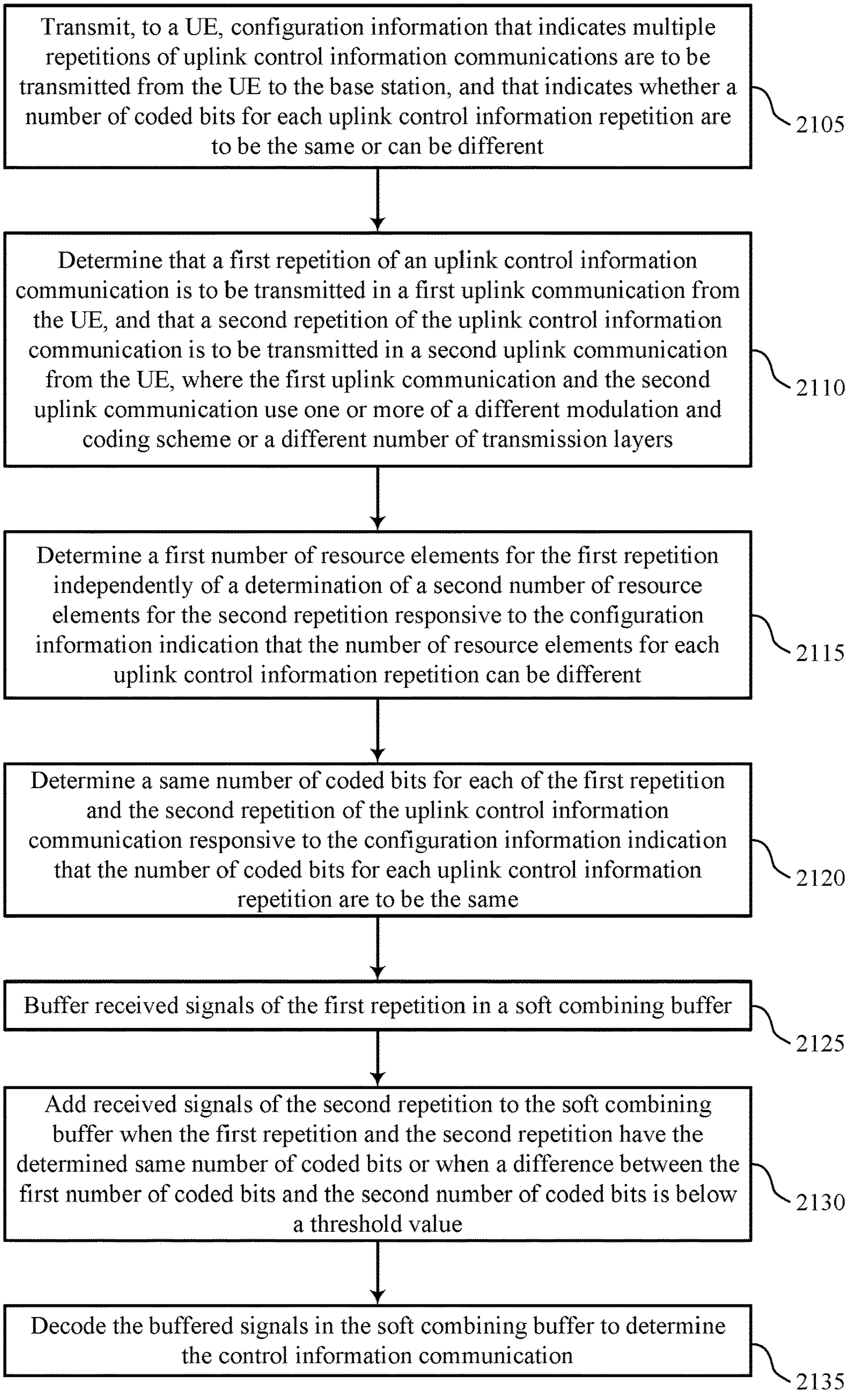

FIG. 21 shows a flowchart illustrating a method 2100 that supports UCI repetition multiplexing with uplink shared channel communications in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, configuration information that indicates multiple repetitions of uplink control information communications are to be transmitted from the UE to the base station, and that indicates whether a number of coded bits for each uplink control information repetition are to be the same or can be different. The operations of 2105 may be performed according to the methods described herein. In some examples, aspects of the operations of 2105 may be performed by a configuration manager as described with reference to FIGS. 12 through 15.

At 2110, the base station may determine that a first repetition of an uplink control information communication is to be transmitted in a first uplink communication from the UE, and that a second repetition of the uplink control information communication is to be transmitted in a second uplink communication from the UE, where the first uplink communication and the second uplink communication use one or more of a different modulation and coding scheme or a different number of transmission layers. The operations of 2110 may be performed according to the methods described herein. In some examples, aspects of the operations of 2110 may be performed by a repetition resource manager as described with reference to FIGS. 12 through 15.

At 2115, the base station may determine a first number of resource elements for the first repetition independently of a determination of a second number of resource elements for the second repetition responsive to the configuration information indication that the number of resource elements for each uplink control information repetition can be different. The operations of 2115 may be performed according to the methods described herein. In some examples, aspects of the operations of 2115 may be performed by a repetition resource manager as described with reference to FIGS. 12 through 15.

At 2120, the base station may determine a same number of coded bits for each of the first repetition and the second repetition of the uplink control information communication responsive to the configuration information indication that the number of coded bits for each uplink control information repetition are to be the same. The operations of 2120 may be performed according to the methods described herein. In some examples, aspects of the operations of 2120 may be performed by a coded bit calculation manager as described with reference to FIGS. 12 through 15.

At 2125, the base station may buffer received signals of the first repetition in a soft combining buffer. The operations of 2125 may be performed according to the methods described herein. In some examples, aspects of the operations of 2125 may be performed by a soft buffer as described with reference to FIGS. 12 through 15.

At 2130, the base station may add received signals of the second repetition to the soft combining buffer when the first repetition and the second repetition have the determined same number of coded bits or when a difference between the first number of coded bits and the second number of coded bits is below a threshold value. The operations of 2130 may be performed according to the methods described herein. In some examples, aspects of the operations of 2130 may be performed by a soft buffer as described with reference to FIGS. 12 through 15.

At 2135, the base station may decode the buffered signals in the soft combining buffer to determine the control information communication. The operations of 2135 may be performed according to the methods described herein. In some examples, aspects of the operations of 2135 may be performed by a decoder as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

determining that a first repetition of a control information communication is to be transmitted in a first uplink communication, and that a second repetition of the control information communication is to be transmitted in a second uplink communication, wherein the first uplink communication uses first transmission parameters that are provided for a first physical uplink shared channel (PUSCH) resource and the second uplink communication uses second transmission parameters that are provided for a second PUSCH resource, and wherein the first transmission parameters include one or more of a different modulation and coding scheme or a different number of transmission layers than the second transmission parameters;

determining, based at least in part on the first transmission parameters and the second transmission parameters, a number of resource elements for transmitting each of the first repetition and the second repetition of the control information communication such that each of the first repetition and the second repetition have a same number of coded bits;

encoding, based at least in part on the determined number of resource elements, the first repetition of the control information communication and the second repetition of the control information communication to generate an encoded first repetition and an encoded second repetition that each have the same number of coded bits; and transmitting the first uplink communication with the encoded first repetition and the second uplink communication with the encoded second repetition.

2. The method of claim 1, wherein the first uplink communication uses the first PUSCH resource and the second uplink communication uses the second PUSCH resource.

3. The method of claim 1, wherein the determining the same number of coded bits further comprises:

calculating a first number of coded bits for the first repetition of the control information communication using the first PUSCH resource;

calculating a second number of coded bits for the second repetition of the control information communication using the second PUSCH resource; and selecting the first number of coded bits or the second number of coded bits to be used for both the first repetition and the second repetition of the control information communication.

4. The method of claim 3, wherein a minimum or a maximum of the first number of coded bits or the second number of coded bits is selected to be used for both the first repetition and the second repetition of the control information communication based at least in part on a configuration of the UE.

5. The method of claim 3, wherein the first number of coded bits associated with the first PUSCH resource or the second number of coded bits associated with the second PUSCH resource is selected based at least in part on a configuration of the UE.

6. The method of claim 3, wherein an encoding sequence and a rate-matching output sequence associated with the first repetition of the control information communication and the second repetition of the control information communication have a same length that allows for soft combining of multiple repetitions of the control information communication.

7. The method of claim 3, wherein:

the coded bits of the first repetition or the second repetition of the control information communication are padded with zeros when the selected number of coded bits is less than the first number of coded bits or the second number of coded bits, or a last number of coded bits of the first repetition or the second repetition of the control information communication are dropped when the selected number of coded bits is greater than the first number of coded bits or the second number of coded bits.

8. The method of claim 1, wherein the determining the same number of coded bits further comprises:

calculating a first number of coded bits for the first repetition of the control information communication using the first PUSCH resource;

mapping the first number of coded bits to a first number of resource elements on the first PUSCH resource; and calculating a second number of coded bits based on the first number of coded bits, wherein the second number of coded bits associated with a second number of resource elements is equal to the first number of coded bits.

9. A method for wireless communication at an access network entity, comprising:

determining that a first repetition of a control information communication from a user equipment (UE) is to be received in a first uplink communication, and that a second repetition of the control information communication is to be received in a second uplink communication from the UE, wherein the first uplink communication uses first transmission parameters that are provided for a first physical uplink shared channel (PUSCH) resource and the second uplink communication uses second transmission parameters that are provided for a second PUSCH resource, and wherein the first transmission parameters include one or more of a different modulation and coding scheme or a different number of transmission layers than the second transmission parameters;

determining, based at least in part on the first transmission parameters and the second transmission parameters, a number of resource elements for each of the first repetition and the second repetition of the control information communication such that each of the first repetition and the second repetition have a same number of coded bits;

buffering received signals from the determined number of resource elements of the first repetition in a soft combining buffer;

adding received signals from the determined number of resource elements of the second repetition to the soft combining buffer; and decoding the buffered signals in the soft combining buffer to determine the control information communication.

10. The method of claim 9, wherein the first uplink communication uses the first PUSCH resource and the second uplink communication uses the second PUSCH resource.

11. The method of claim 9, wherein the determined number of coded bits is selected from a first number of coded bits associated with the first PUSCH resource or from a second number of coded bits associated with the second PUSCH resource.

12. The method of claim 11, wherein a minimum or a maximum of the first number of coded bits or the second number of coded bits is selected to be used for both the first repetition and the second repetition of the control information communication based at least in part on a configuration of the UE.

13. The method of claim 11, wherein a number of coded bits associated with the first PUSCH resource or the second PUSCH resource is selected based at least in part on a configuration of the UE.

14. The method of claim 9, wherein the determining the same number of coded bits comprises:

determining a first number of coded bits associated with the first PUSCH resource associated with the first repetition of the control information communication, and wherein a second number of coded bits associated with the second repetition of the control information communication using the second PUSCH resource is determined based on the first number of coded bits.

15. An apparatus for wireless communication at a user equipment (UE), comprising:

one or more processors, one or more memories coupled with the one or more processors; and instructions stored in the one or more memories and executable by the one or more processors to cause the apparatus to:

determine that a first repetition of a control information communication is to be transmitted in a first uplink communication, and that a second repetition of the control information communication is to be transmitted in a second uplink communication, wherein the first uplink communication uses first transmission parameters that are provided for a first physical uplink shared channel (PUSCH) resource and the second uplink communication uses second transmission parameters that are provided for a second PUSCH resource, and wherein the first transmission parameters include one or more of a different modulation and coding scheme or a different number of transmission layers than the second transmission parameters;

determine, based at least in part on the first transmission parameters and the second transmission parameters, a number of resource elements for transmitting each of the first repetition and the second repetition of the control information communication such that each of the first repetition and the second repetition have a same number of coded bits;

encode, based at least in part on the determined number of resource elements, the first repetition of the control information communication and the second repetition of the control information communication to generate an encoded first repetition and an encoded second repetition that each have the same number of coded bits; and transmit the first uplink communication with the encoded first repetition and the second uplink communication with the encoded second repetition.

16. The apparatus of claim 15, wherein the first uplink communication uses the first PUSCH resource and the second uplink communication uses the second PUSCH resource.

17. The apparatus of claim 15, wherein the instructions are further executable to cause the apparatus to:

calculate a first number of coded bits for the first repetition of the control information communication using the first PUSCH resource;

calculate a second number of coded bits for the second repetition of the control information communication using the second PUSCH resource; and select the first number of coded bits or the second number of coded bits to be used for both the first repetition and the second repetition of the control information communication.

18. The apparatus of claim 17, wherein a minimum or a maximum of the first number of coded bits or the second number of coded bits is selected to be used for both the first repetition and the second repetition of the control information communication based at least in part on a configuration of the UE.

19. The apparatus of claim 17, wherein the first number of coded bits associated with the first PUSCH resource or the second number of coded bits associated with the second PUSCH resource is selected based at least in part on a configuration of the UE.

20. The apparatus of claim 17, wherein an encoding sequence and a rate-matching output sequence associated with the first repetition of the control information communication and the second repetition of the control information communication have a same length that allows for soft combining of multiple repetitions of the control information communication.

21. The apparatus of claim 17, wherein:

the coded bits of the first repetition or the second repetition of the control information communication are padded with zeros when the selected number of coded bits is less than the first number of coded bits or the second number of coded bits, or a last number of coded bits of the first repetition or the second repetition of the control information communication are dropped when the selected number of coded bits is greater than the first number of coded bits or the second number of coded bits.

22. The apparatus of claim 15, wherein the instructions are further executable to cause the apparatus to:

calculate a first number of coded bits for the first repetition of the control information communication using the first PUSCH resource;

map the first number of coded bits to a first number of resource elements on the first PUSCH resource; and calculate a second number of coded bits based on the first number of coded bits, wherein the second number of coded bits associated with a second number of resource elements is equal to the first number of coded bits.

23. An apparatus for wireless communication at an access network entity, comprising:

one or more processors, one or more memories coupled with the one or more processors; and instructions stored in the one or more memories and executable by the one or more processors to cause the apparatus to:

determine that a first repetition of a control information communication from a user equipment (UE) is to be received in a first uplink communication, and that a second repetition of the control information communication is to be received in a second uplink communication from the UE, wherein the first uplink communication uses first transmission parameters that are provided for a first physical uplink shared channel (PUSCH) resource and the second uplink communication uses second transmission parameters that are provided for a second PUSCH resource, and wherein the first transmission parameters include one or more of a different modulation and coding scheme or a different number of transmission layers than the second transmission parameters;

determine, based at least in part on the first transmission parameters and the second transmission parameters, a number of resource elements for each of the first repetition and the second repetition of the control information communication such that each of the first repetition and the second repetition have a same number of coded bits;

buffer received signals from the determined number of resource elements of the first repetition in a soft combining buffer;

add received signals from the determined number of resource elements of the second repetition to the soft combining buffer; and decode the buffered signals in the soft combining buffer to determine the control information communication.

24. The apparatus of claim 23, wherein the first uplink communication uses the first PUSCH resource and the second uplink communication uses the second PUSCH resource.

25. The apparatus of claim 23, wherein the determined number of coded bits is selected from a first number of coded bits associated with the first PUSCH resource or from a second number of coded bits associated with the second PUSCH resource.

26. The apparatus of claim 25, wherein a minimum or a maximum of the first number of coded bits or the second number of coded bits is selected to be used for both the first repetition and the second repetition of the control information communication based at least in part on a configuration of the UE.

27. The apparatus of claim 25, wherein a number of coded bits associated with the first PUSCH resource or the second PUSCH resource is selected based at least in part on a configuration of the UE.

28. The apparatus of claim 23, wherein the instructions are further executable to cause the apparatus to:

determine a first number of coded bits associated with the first PUSCH resource associated with the first repetition of the control information communication, and wherein a second number of coded bits associated with the second repetition of the control information communication using the second PUSCH resource is determined based on the first number of coded bits.

* * * * *